United States Patent
Sato et al.

(10) Patent No.: US 8,503,119 B2
(45) Date of Patent: Aug. 6, 2013

(54) LEAF SPRING WITH HIGH VICKERS HARDNESS

(75) Inventors: Keiichi Sato, Tokyo (JP); Takashi Uemura, Tokyo (JP); Tomohiko Osaka, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 215 days.

(21) Appl. No.: 13/031,745

(22) Filed: Feb. 22, 2011

(65) Prior Publication Data

US 2011/0205646 A1    Aug. 25, 2011

(30) Foreign Application Priority Data

Feb. 22, 2010 (JP) .................................. 2010-035824

(51) Int. Cl.
*G02B 7/02* (2006.01)

(52) U.S. Cl.
USPC .......................................................... 359/824

(58) Field of Classification Search
USPC .......................................................... 359/824
See application file for complete search history.

(56) References Cited

U.S. PATENT DOCUMENTS

| | | | |
|---|---|---|---|
| 2006/0168871 A1 * | 8/2006 | Wagner | 42/122 |
| 2011/0030368 A1 | 2/2011 | Kume | |

FOREIGN PATENT DOCUMENTS

| | | |
|---|---|---|
| JP | 6-053859 U | 7/1994 |
| JP | 9-210206 A | 8/1997 |
| JP | 11-148736 A | 6/1999 |
| JP | 2006-201525 A | 8/2006 |
| JP | 2007-322540 A | 12/2007 |
| JP | 2008-106359 A | 5/2008 |
| JP | 2008-261937 A | 10/2008 |
| JP | 2009-122360 A | 6/2009 |
| JP | 2009-128736 A | 6/2009 |
| JP | 2009-210055 A | 9/2009 |

OTHER PUBLICATIONS

U.S. Appl. No. 13/031,764; First Named Inventor: Tomohiko Osaka; Title: "Leaf Spring With High Thrust"; filed Feb. 22, 2011.
Japanese Office Action dated May 22, 2013 (and English translation thereof) in counterpart Japanese Application No. 2010-035824.

* cited by examiner

*Primary Examiner* — James Jones
(74) *Attorney, Agent, or Firm* — Holtz, Holtz, Goodman & Chick, P.C.

(57) ABSTRACT

A leaf spring supports a pillar shaped movable portion disposed in a center portion with respect to a cylindrical fixed portion disposed around the movable portion in the direction of a center axis shiftably so as to position the movable portion in a radial direction. The leaf spring is made of a material having Vickers hardness which is not less than 500 (HV).

19 Claims, 22 Drawing Sheets

CHEMICAL COMPONENTS (MASS%)

| STEEL TYPE | C | Si | Mn | P | S | Ni | Cr | N |
|---|---|---|---|---|---|---|---|---|
| NTK S-4 | 0.25 OR LESS | 1.00 OR LESS | 14.00~16.00 | 0.060 OR LESS | 0.030 OR LESS | 1.00~2.00 | 16.00~18.00 | 0.50 OR LESS |

CHEMICAL COMPONENTS (MASS%)

| STEEL TYPE | JIS | C | Si | Mn | P | S | Ni | Cr | N |
|---|---|---|---|---|---|---|---|---|---|
| NTK 301 | SUS301 | 0.15 OR LESS | 1.00 OR LESS | 2.00 OR LESS | 0.045 OR LESS | 0.030 OR LESS | 6.00~ 8.00 | 16.00~ 18.00 | — |

LEAF SPRING WITH HIGH VICKERS HARDNESS

This application is based upon and claims the benefit of priority from Japanese Patent Application JP 2010-035824, filed on Feb. 22, 2010, the disclosure of which is incorporated herein in its entirety by reference.

BACKGROUND OF THE INVENTION

This invention relates to a lens driving device and, in particular, to leaf springs (a supporting member; an elastic member) which are disposed both sides of a tubular portion of a lens holder (a movable portion) for holding a lens assembly (a lens barrel) in the direction of an optical axis and which support the lens holder in the direction of the optical axis shiftably so as to position the lens holder in a radial direction with respect to a housing (a fixed portion).

The portable compact camera is mounted in a camera-equipped cellular mobile phone. The portable compact camera is provided with the autofocus lens driving device. Previously, various autofocus lens driving devices have been proposed.

As a driving source (a driving method) used in such a lens driving device, there are a VCM method using a voice coil motor (VCM) and a SMA method using shape memory alloy (SMA). The lens driving device of either of the above-mentioned two methods uses a supporting member (an elastic member) which supports a movable portion (a lens pulse a lens holder) including the lens in the direction of an optical axis (the direction of a center axis) shiftably so as to position the movable portion in a radial direction with respect to a fixed portion. As such as a supporting member (an elastic member), at least one leaf spring is generally used.

Conventionally, as a material of the leaf spring, beryllium copper or SUS base steel material is used (see, e.g. Japanese Unexamined Patent Application Publication No. 2009-122360 (JP-A 2009-122360)).

In addition, various plate springs having improved impact resistance have been proposed.

By way of illustration, Japanese Unexamined Patent Application Publication No. 2009-210055 (JP-A 2009-210055) discloses a cheap leaf spring having improved impact resistance. The leaf spring comprises an inner edge portion (an inner ring portion) and an outer edge portion (an outer ring portion) each of which is formed in an annular ring shape, and N arm portions disposed along a circumferential direction in order to couple them. Each arm portion extends along the circumferential direction. Disposed between the inner edge portion and each arm portion, an inner coupling portion protrudes from the inner edge portion in a radial direction outwardly. Disposed between the outer edge portions and each arm portion, an outer coupling portion protrudes from the outer edge portion in a radial direction inwardly. At least one of an inner basal portion and an outer basal portion of the arm portion has a plate width which is wider than that of a longitudinally center portion of the arm portion.

In addition, Japanese Unexamined Patent Application Publication No. 2007-322540 (JP-A 2007-322540) discloses a camera module superior in impact resistance by preventing stress concentration to a base part (a basal portion) of a crosslinking parts (arm portions) of a leaf spring due to impact. The leaf spring disclosed in JP-A 2007-322540 comprises an outer ring part, an inner ring part displacing to the outer ring part, and three crosslinking parts (arm portions) for supporting the inner ring part to the outer ring part. Each crosslinking part extends along the inner peripheral edge of the outer ring part and the outer peripheral edge of the inner ring part in a ring-like gap formed between the outer ring part and the inner ring part. The crosslinking part has a slit serving as stress concentration prevention means.

In the cellular mobile phone equipping the portable compact camera driven by the above-mentioned autofocus lens driving device, improvement (increase) of two kinds of performance (characteristic) is required as follows. A first kind of performance (characteristic) is impact resistant performance (characteristic) with respect to drop or like on use and storage of the cellular mobile phone. A second kind of performance (characteristic) is lens inclination (tilt) performance (characteristic) on operation with large pixels of the camera equipped in the cellular mobile phone.

The two kinds of performance (characteristic) has a dependence on the above-mentioned leaf spring largely. In order to improve (increase) the impact resistant performance (characteristic), it may make "distortion" of stiffness of the leaf spring in a plane direction small. On the other hand, in order to improve (increase) the lens inclination (tilt) performance (characteristic) on operation, it may make "torsional rigidity" of the whole (leaf spring pulse lens holder) large.

However, the stiffness of the leaf spring in the plane direction and the "torsional rigidity" of the whole (leaf spring pulse lens holder) are indirectly proportional to each other. That is, the impact resistant performance (characteristic) and the lens inclination (tilt) performance (characteristic) where the leaf spring is predominant are indirectly proportional to each other.

It is known in the art that beryllium copper used as the material of the leaf spring is superior in the above-mentioned first and second kinds of performance (characteristic). Therefore, beryllium copper is widely used as material of a high performance spring. However, it is also known in the art that a compound of beryllium is highly poisonous. It is therefore desirable that material other than beryllium copper is used as the material of the leaf spring in view of environment, namely, beryllium-free.

On the other hand, in the lens driving device adopting the VCM method as a driving method, permanent magnets are used as driving means. Therefore, if a magnetic material having high magnetic permeability is used as the material of the leaf spring, it has a detrimental effect on performance of the lens driving device. Accordingly, it is preferable that material having low magnetic permeability is used as the material of the leaf spring. Stainless steel used normally is non-magnetic material where relative magnetic permeability is about one.

SUMMARY OF THE INVENTION

It is an exemplary object of the present invention to provide a leaf spring and a lens driving device which improves (increases) both of lens inclination (tilt) performance (characteristic) and impact resistant performance (characteristic).

Other objects of this invention will become clear as the description proceeds.

On describing the gist of an exemplary aspect of this invention, it is possible to be understood that a leaf spring supports a pillar shaped movable portion disposed in a center portion with respect to a cylindrical fixed portion disposed around the movable portion in the direction of a center axis shiftably so as to position the movable portion in a radial direction. According to the exemplary aspect of this invention, the leaf spring is made of a material having Vickers hardness which is not less than 500 (HV).

DESCRIPTION OF THE PREFERRED EMBODIMENTS

First Exemplary Embodiment

Figure 1:
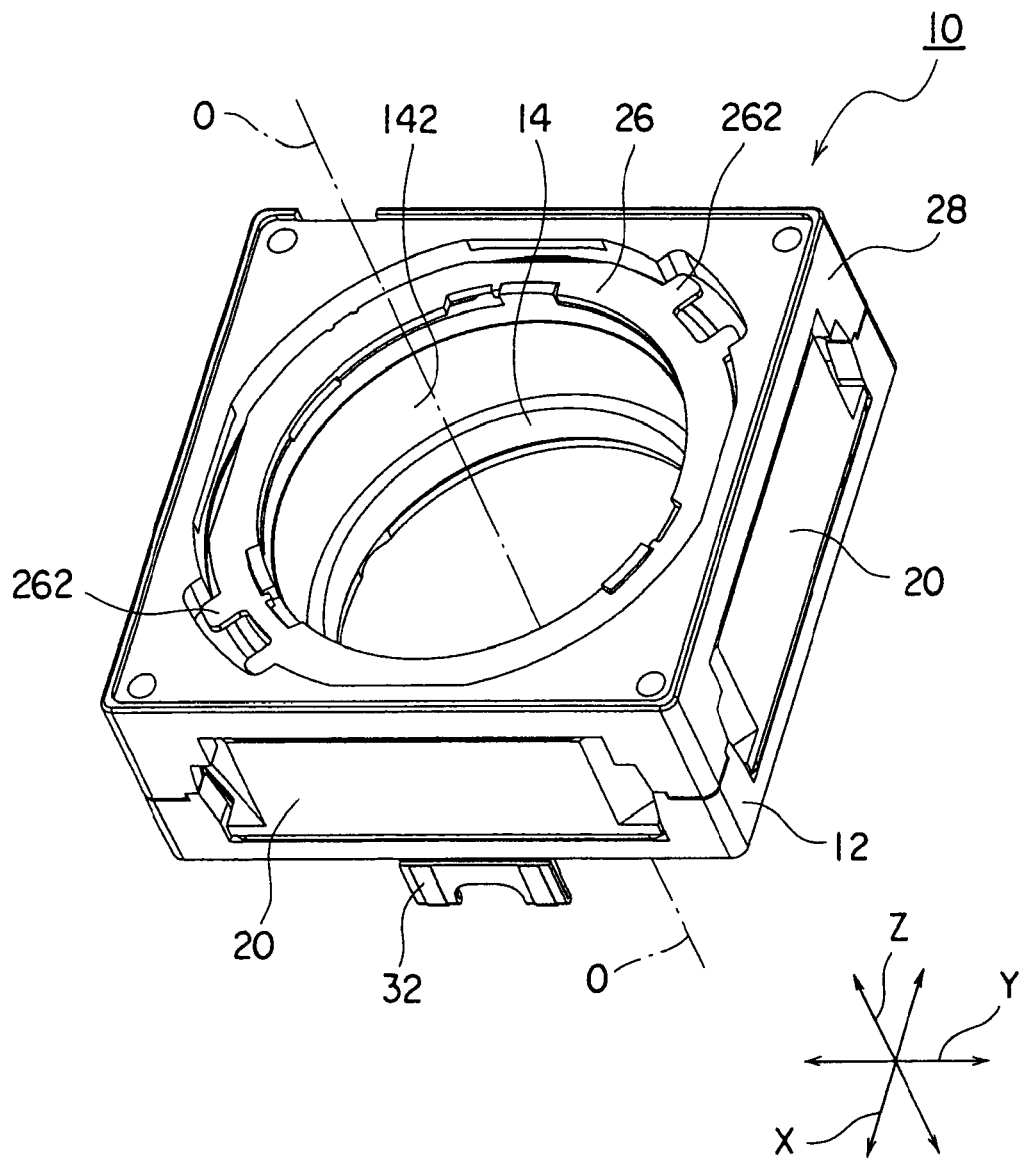
FIG. 1 is a perspective view of a lens driving device according to a first exemplary embodiment of the present invention.
Figure 2:
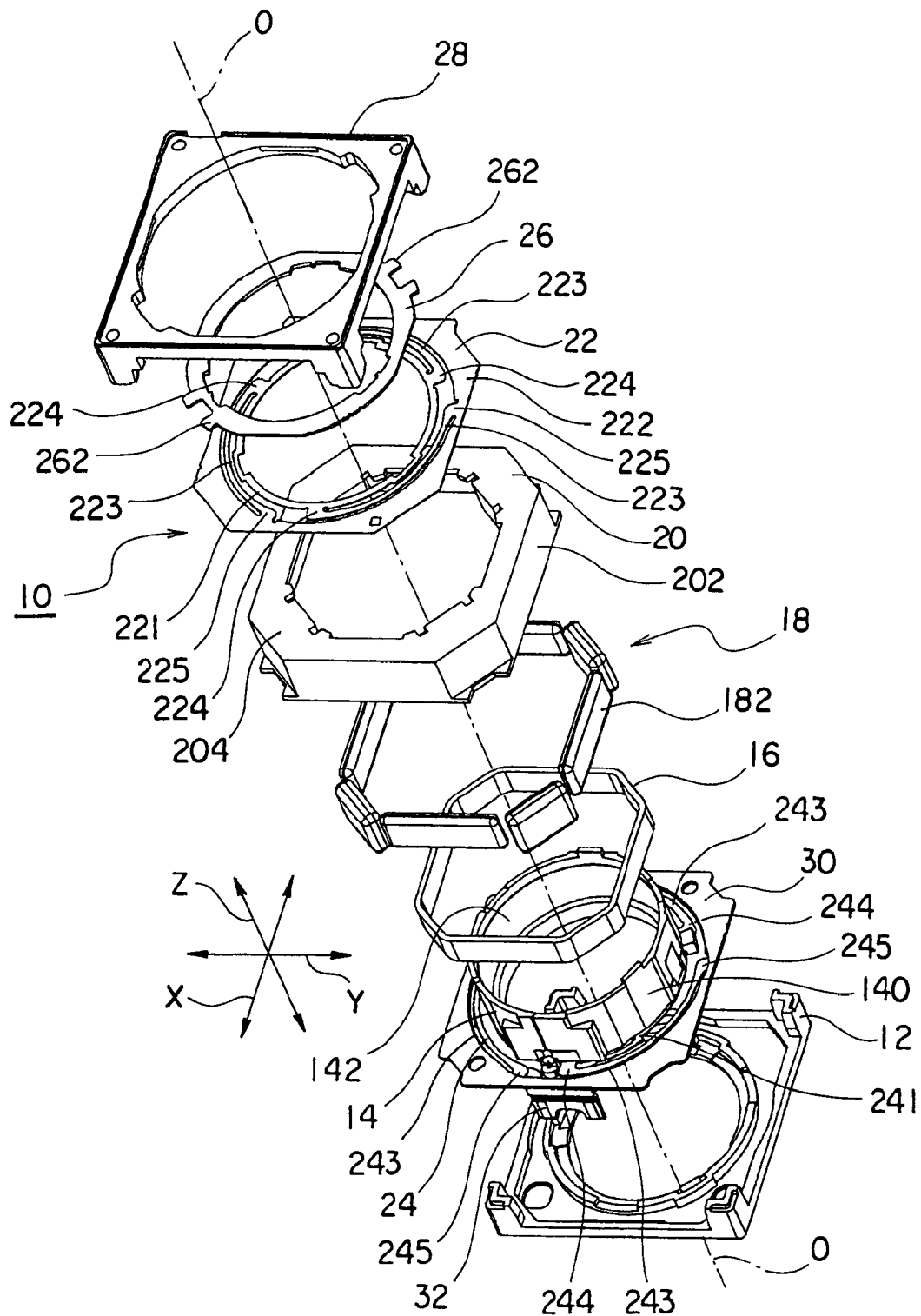
FIG. 2 is an exploded perspective view of the lens driving device illustrated in FIG. 1.

Referring to FIGS. 1 and 2, the description will proceed to a lens driving device 10 according to a first exemplary embodiment of this invention. FIG. 1 is a perspective view of the lens driving device 10. FIG. 2 is an exploded perspective view of the lens driving device 10.

Herein, in the manner shown in FIGS. 1 and 2, an orthogonal coordinate system (X, Y, Z) is used. In a state illustrated in FIGS. 1 and 2, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In addition, in the example being illustrated in FIGS. 1 and 2, the up-and-down direction Z is a direction of an optical axis O of a lens.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrate lens driving device 10 is a lens driving device adopting, as a driving source (a driving method), a VCM method using a voice coil motor (VCM).

The illustrated lens driving device 10 is mounted to a camera-equipped cellular mobile phone which is able to perform automatic focusing. The lens driving device 10 is for moving a lens assembly (a lens barrel) (not shown) in the direction of the optical axis O. The lens driving device 10 comprises an actuator base 12 which is disposed in a lower side (a rear side) in the Z-axis direction (the direction of the optical axis O). Although illustration is not made, the actuator base 12 has a lower portion (a rear portion) on which an image pickup device disposed on a module board is mounted. The image pickup device picks up a subject image formed by the lens assembly to convert it into an electric signal. The image pickup device may, for example, comprise a CCD (charge coupled device) type image sensor, a CMOS (complementary metal oxide semiconductor) type image sensor, or the like. Accordingly, a camera module comprises a combination of the lens driving device 10, the module board, and the image pickup device.

The lens driving device 10 comprises a lens holder 14 including a tubular portion 140 for holding the lens assembly (the lens barrel), a driving coil 16 fixed to the lens holder 14 so as to position around the tubular portion 140 thereof, a yoke 20 comprising a permanent magnet 18 opposite to the driving coil 16, a pair of leaf springs 22 and 24 disposed to both sides of the tubular portion 140 of the lens holder 14 in the direction of the optical axis O. The pair of leaf springs 22 and 24 supports the lens holder 14 in the direction of the optical axis O shiftably so as to position the lens holder 14 in a radial direction. In the pair of leaf springs 22 and 24, the one leaf spring 22 is called an upper leaf spring, another leaf spring 24 is called a lower leaf spring.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 22 is also called a front-side spring while the lower leaf spring 24 is also called a rear-side spring.

Either of the upper leaf spring (the front-side spring) 22 and the lower leaf spring (the rear-side spring) 24 is made of metal of a special stainless steel in the manner which will later be described. In addition, the upper leaf spring (the front-side spring) 22 and the lower leaf spring (the rear-side spring) 24 are manufactured by a press working against a predetermined thin plate or an etching working using photolithography technique. The etching working is desirable than the press working. This is because residual stress does not remain in the leaf spring in the etching working.

As shown in FIG. 2, the yoke 20 has an octagonal cylindrical shape. Specifically, the yoke 20 comprises an outer hollow cylindrical portion 202 having the octagonal cylindrical shape and an octagonal ring-shaped end portion 204 disposed on an upper end (a front end) of the outer hollow cylindrical portion 202. Accordingly, the driving coil 16 also has an octagonal cylindrical shape matched with a shape of the octagonal cylindrical-shaped yoke 20. The permanent magnet 18 comprises eight rectangular permanent magnet pieces 182 which are disposed to the octagonal cylindrical-shaped outer hollow cylindrical portion 202 of the yoke 20 at the respective sides thereof.

As shown in FIG. 2, the permanent magnet 18 is disposed with a space between it and the driving coil 16 on an inner surface of the outer hollow cylindrical portion 202 of the yoke 20.

The upper leaf spring (the front-side spring) 22 is disposed at an upper side (a front side) of the lens holder 14 in the direction of the optical axis O while the lower leaf spring (the rear-side spring) 24 is disposed at a lower side (a rear side) of the lens holder 14 in the direction of the optical axis O. The upper leaf spring (the front-side spring) 22 and the lower leaf spring (the rear-side spring) 24 have the substantially same structure.

The upper leaf spring (the front-side spring) 22 comprises an inner edge portion 221 mounted on the lens holder 14, an outer edge portion 222 mounted on the yoke 20, and N arm portions (crosslinking portion) 223 disposed along a circumferential direction to connect the inner edge portion 221 and the outer edge portion 222, where N represents an integer which is not less than two. The inner edge portion 221 has an annular shape. The outer edge portion 222 is apart from the inner edge portion 221 and has a radius larger that that of inner edge portion 221. Each arm portion 223 extends along the circumferential direction. An inner coupling portion 224, which couples the inner edge portion 221 with each arm portion 223, protrudes from the inner edge portion 221 in a radial direction outwardly. An outer coupling portion 225, which couples the outer edge portion 222 with each arm portion 223, protrudes from the outer edge portion 222 in the radial direction inwardly.

Likewise, the lower leaf spring (the rear-side spring) 24 comprises an inner edge portion 241 mounted on the lens holder 14, an outer edge portion (not shown) mounted on the yoke 20, N arm portions (crosslinking portion) 243 disposed along the circumferential direction to connect the inner edge portion 241 and the outer edge portion. The inner edge portion 241 has an annular shape. The outer edge portion is apart from the inner edge portion 241 and has a radius larger that that of inner edge portion 241. Each arm portion 243 extends along the circumferential direction. An inner coupling portion 244, which couples the inner edge portion 241 with each arm portion 243, protrudes from the inner edge portion 241 in a radial direction outwardly. An outer coupling portion 245, which couples the outer edge portion with each arm portion 243, protrudes from the outer edge portion in the radial direction inwardly.

In addition, the inner edge portion is also called an inner ring (an inner ring portion) while the outer edge portion is also called an outer ring (an outer ring portion).

The inner edge portion 221 of the upper leaf spring (the front-side spring) 22 is sandwiched between the lens holder 14 and a stopper 26 to be fixed to them. In other words, the stopper 26 is fitted to the lens holder 14 so as to sandwich the inner edge portion 221 of the upper leaf spring (the front-side spring) 22 between it and the lens holder 14. On the other hand, the outer edge portion 222 of the upper leaf spring (the front-side spring) 22 is sandwiched between the yoke 20 and a cover 28 to be fixed to them.

The stopper 26 has functions as follows. That is, the stopper 26 has a function for bringing the inner edge portion 221 of the upper leaf spring (the front-side spring) 22 into intimate contact with the lens holder 14 without variations and with very high precision. It is therefore possible to improve variations in a VCM (voice coil motor) characteristic. In addition, the stopper 26 has a function for improving the adherability of the upper leaf spring (the front-side spring) 22. Accordingly, the lens driving device 10 has an improved impact-resistance. Furthermore, the stopper 26 has a function for preventing deformation of the upper leaf spring (the front-side spring) 22 on a drop impact of the lens driving device 10. Accordingly, the lens driving device 10 has also the improved impact-resistance. The stopper 26 has a function for determining a mechanical stroke of the lens driving device 10.

In addition, in the manner which will later be described, a rotation-inhibiting function for the lens holder 14 is also added to the stopper 26 in the exemplary embodiment.

On the other hand, the outer edge portion of the lower leaf spring (the rear-side spring) 24 is fixed to the yoke 20 through a spacer 30. In other words, the spacer 30 and the outer edge portion of the lower leaf spring (the rear-side spring) 24 are sandwiched between the yoke 20 and the actuator base 12 to be fixed to them. The inner edge portion 241 of the lower leaf spring (the rear-side spring) 24 is fixed to the lens holder 14 at a lower end (a rear end) side thereof.

The tubular portion 140 of the lens holder 14 has an inner wall in which a female screw thread 142 is cut. On the other hand, although the illustration is not made, the lens assembly (the lens barrel) has an outer wall in which a male screw thread screwed in the above-mentioned female screw thread 142 is cut. In a case of fitting the lens assembly (the lens barrel) to the lens holder 14, it includes the steps of rotating the lens assembly (the lens barrel) with respect to the tubular portion 140 of the lens holder 14 around the optical axis O to screw it along the direction of the optical axis O thereby accommodating the lens assembly (the lens barrel) in the lens holder 14, and of connecting them to each other via an adhesive agent or the like.

In this event, although it is feared that the lens holder 14 rotates together with it, it perfectly prevents the lens holder 14 from rotating in the manner which will later be described.

By energizing the driving coil 16, it is possible to positionally adjust the lens holder 14 (the lens assembly) in the direction of the optical axis O according to interaction between a magnetic field of the permanent magnet 18 and a magnetic field due to an electric current flowing through the driving coil 16.

A sheet-like electrode 32 is disposed between the lower leaf spring (the rear-side spring) 24 and the actuator base 12. The sheet-like electrode 32 is for supplying the driving coil 16 with power.

In the illustrated exemplary embodiment, the stopper 26 has two U-shaped rotation-inhibiting holding portions 262 which are disposed at positions of 2-hold rotational symmetry that are rotated by 180 degrees with respect to the optical axis O. These U-shaped rotation-inhibiting holding portions 262 serve as a rotation-inhibiting member which perfectly prevents the lens holder 14 from rotating when the lens assembly is fitted to the tubular portion 140 of the lens holder 14. That is, on fitting the lens assembly to the tubular portion 140 of the lens holder 14, by inserting a jig (not shown) in the two U-shaped rotation-inhibiting holding portions 262 to hold it, it is possible to perfectly prevent the lens holder 14 from rotating. In this event, a clearance between the stopper 16 and the cover 28 is ensured (kept).

In the above-mentioned lens driving device 10, a combination of the lens holder 14 for holding the lens assembly and the driving coil 16 serves as a pillar shaped movable portion (14, 16) disposed in a center portion. In addition, a combination of the actuator base 12, the permanent magnet 18, the yoke 20, and the cover 28 serves as a cylindrical fixed portion (12, 18, 20, 28) disposed around the movable portion (14, 16). The upper leaf spring (the front-side spring) 22 and the lower leaf spring (the rear-side spring) 24 support the pillar shaped movable portion (14, 16) with respect to the cylindrical fixed portion (12, 18, 20, 28) in the direction of a center axis (O) shiftably so as to position the movable portion (14, 16) in a radial direction.

Now, the description will proceed to materials used to the upper leaf spring (the front-side spring) 22 and the lower leaf spring (the rear-side spring) 24. Hereinafter, the upper leaf spring 22 and the lower leaf spring 24 will be collectively called a "leaf spring" simply.

The lens driving device 10 according to the first exemplary embodiment of the present invention uses, as the material of the leaf springs (22, 24), a material having Vickers hardness which is not less than 500 (HV). With this structure, it is possible to provide the lens driving device 10 which is compatible impact resistant performance with lens inclination (tilt) performance.

Example 1

A first example of the present invention uses, as the material of the leaf springs (22, 24), high hardness non-magnetic stainless steel having high Vickers hardness by cold working that is less than 500 (HV) and which has low permeability. Such stainless steel can use, for example, NTK S-4 made in Nippon Metal Industry Co., Ltd (NIKKINKO). Chemical component (mass %) of the NTK S-4 is shown in as FIG. 3.

The high hardness non-magnetic stainless steel has relative magnetic permeability of about 1.002.

Figures 3, 4:
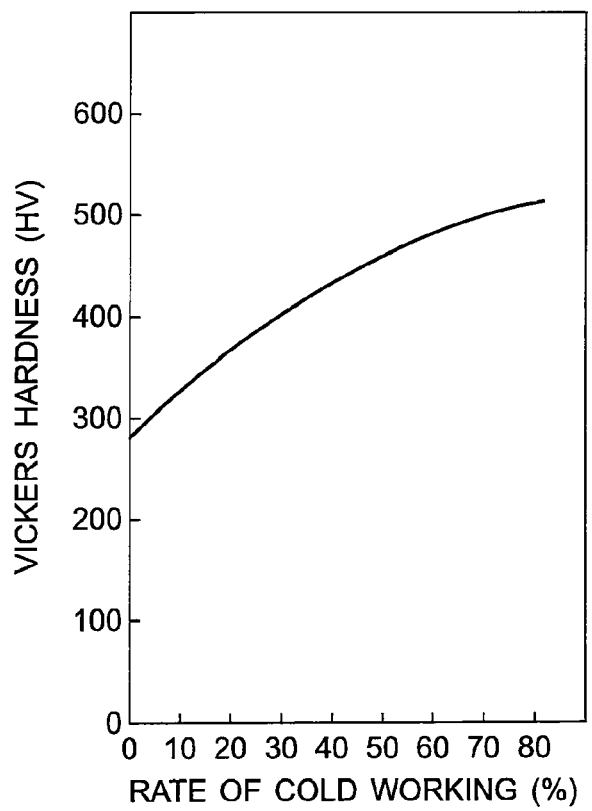
FIG. 3 is a view showing chemical components of a leaf spring according to a first example of the present invention.
FIG. 4 is a characteristic view showing characteristic of Vickers hardness (HV) with respect to a rate of cold working (%) of the leaf spring having the chemical components shown in FIG. 3.

Although a row workpiece thereof has low Vickers hardness of 260 (HV), it is possible to rise the Vickers hardness up to 500 (HV) or more by applying cold working as shown in FIG. 4. In FIG. 4, a horizontal axis represents a rate (%) of the cold working while a vertical axis represents Vickers hardness (HV).

Now, the description will proceed to a method of manufacturing the row workpiece (thin plate) of the leaf spring by cold rolling. First, by using a row workpiece transferring machine, a large coil of the row workpiece is divided to required amount. Subsequently, by using a cold reversible rolling mill, each row workpiece is rolled up to a thickness suitable to an annealing process (intermediate rolling). By using a thin plate degreasing device, rolling oil is removed from the rolled row workpiece (degreasing cleaning). By using an upright continuous bright annealing furnace, a crystalline structure of the rolled row workpiece is adjusted to remove internal distortion (bright annealing). By a cold inverse rolling mill, the adjusted row workpiece is formed so at to have a final thickness and form and is completed to have a predetermined mechanical characteristics (final rolling). By using a thin plate degreasing device, rolling oil is removed from the rolled row workpiece (degreasing cleaning). By using a landscape continuous bright tension annealing furnace, internal distortion is removed from the rolled row workpiece (TA). Finally, by using a thin plate delivery side shear (trimmer), the rolled row workpiece is cut to predetermined dimensions (cutting).

Figures 5, 6:
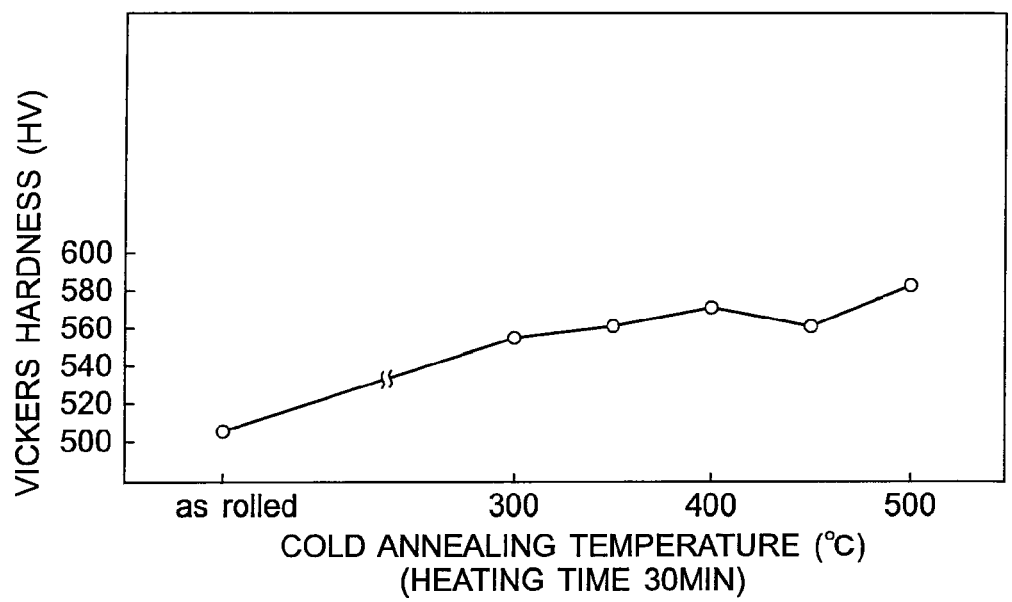
FIG. 5 is a characteristic view showing characteristic of Vickers hardness (HV) with respect to cold annealing temperature (° C.) of the leaf spring having the chemical components shown in FIG. 3.
FIG. 6 is a view showing chemical components of a leaf spring according to a second example of the present invention.

As shown in FIG. 5, it is understood that the Vickers hardness raises by 60 (HV) to 70 (HV) due to a rolled state by cold annealing of 300° C. to 500° C. In FIG. 5, a horizontal axis represents a cold annealing temperature (° C.) while a vertical axis represents Vickers hardness (HV).

Herein, it is known that beryllium copper has Vickers hardness which lies within a range of 380 (HV) and 450 (HV). Accordingly, it is understood that the high hardness non-magnetic stainless steel according to the first example has Vickers hardness which is higher than that of beryllium copper.

In the manner which is well known in the art, it is known that the higher Vickers hardness becomes, the higher yield stress (proof stress) becomes.

In the manner described above, according to the first example, it is possible to provide the lens driving device 10 which makes impact resistant performance compatible with lens inclination (tilt) performance by using, as the material of the leaf springs, the high hardness non-magnetic stainless steel having Vickers hardness of 500 (HV) or more.

Example 2

A second example of the present invention uses, as the material of the leaf springs (22, 24), high hardness stainless steel (austenitic chromium-nickel steel) having high Vickers hardness by cold working that is less than 500 (HV). Such stainless steel can use, for example, NTK 301 (SUS301) made in Nippon Metal Industry Co., Ltd (NIKKINKO). Chemical component (mass %) of the NTK 301 is shown in as FIG. 6.

The high hardness stainless steel has relative magnetic permeability of about 1.50.

Figure 7:
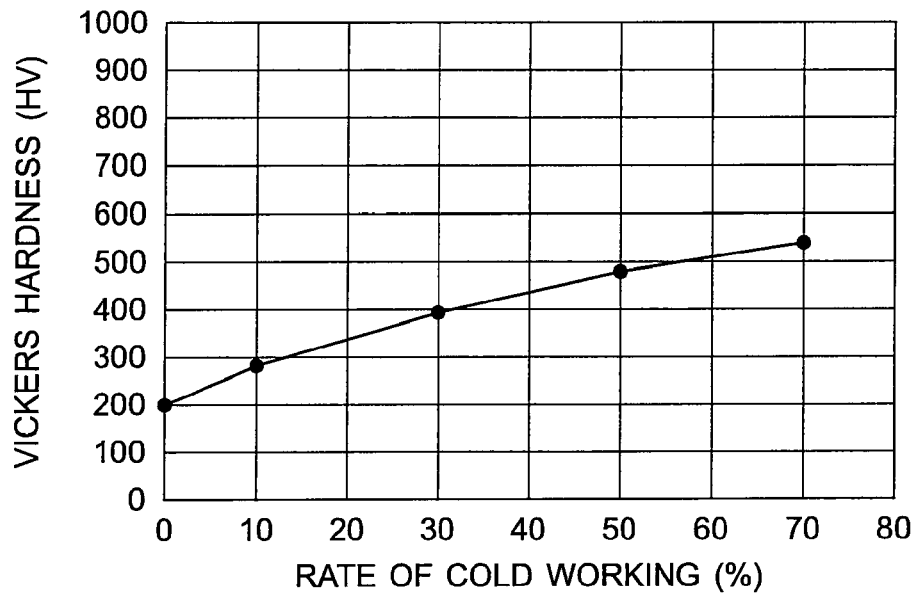
FIG. 7 is a characteristic view showing characteristic of Vickers hardness (HV) with respect to a rate of cold working (%) of the leaf spring having the chemical components shown in FIG. 6.

Although a row workpiece thereof has low Vickers hardness of 191 (HV), it is possible to rise the Vickers hardness up to 500 (HV) or more by applying cold working as shown in FIG. 7. In FIG. 7, a horizontal axis represents a rate (%) of the cold working while a vertical axis represents Vickers hardness (HV).

Inasmuch as a method of manufacturing the row workpiece (thin plate) of the leaf spring by cold rolling is similar to that of the above-mentioned first embodiment, the description thereof is omitted.

Figure 8:
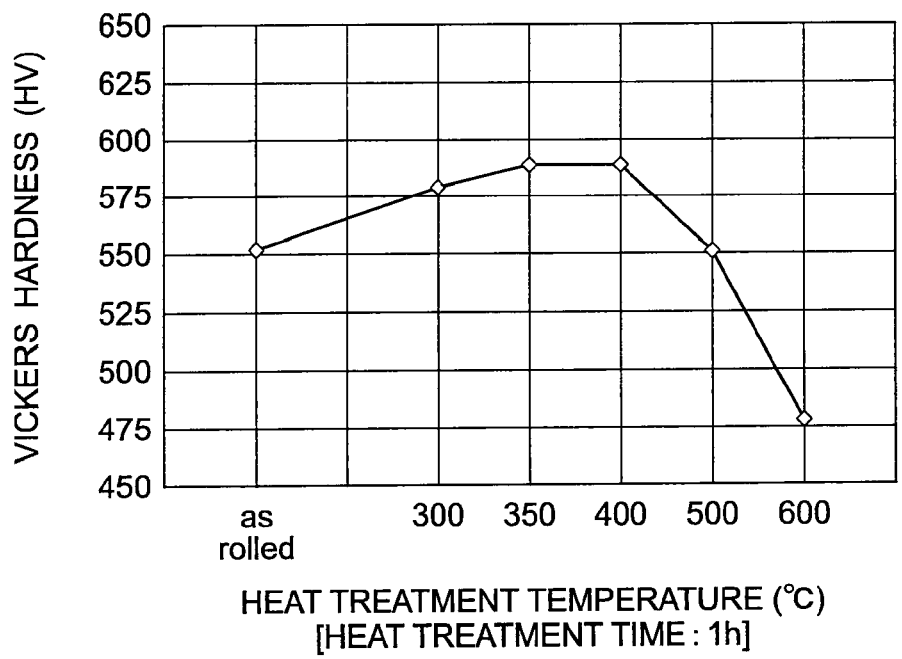
FIG. 8 is a characteristic view showing characteristic of Vickers hardness (HV) with respect to heat treatment temperature (° C.) of the leaf spring having the chemical components shown in FIG. 6.

As shown in FIG. 8, it is understood that the Vickers hardness raises by 30 (HV) to 40 (HV) by heat treatment of 300° C. to 400° C. In FIG. 8, a horizontal axis represents a heat treatment temperature (° C.) while a vertical axis represents Vickers hardness (HV).

Herein, it is known that beryllium copper has Vickers hardness which lies within a range of 380 (HV) and 450 (HV) in the manner described above. Accordingly, it is understood that the high hardness stainless steel according to the second example has Vickers hardness which is higher than that of beryllium copper.

Figure 9:
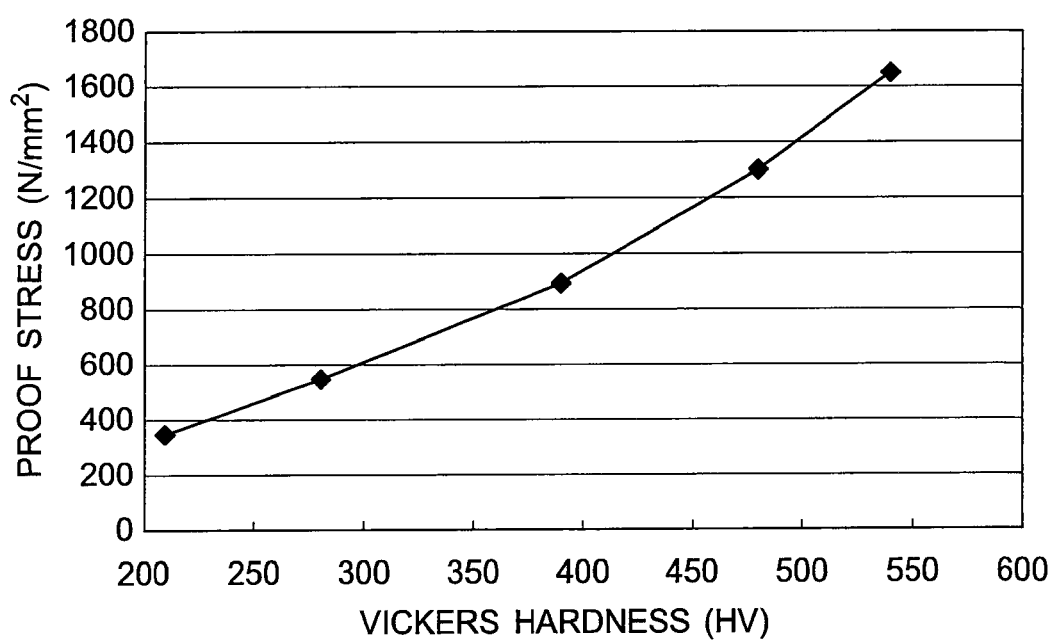
FIG. 9 is a graph showing a relationship between Vickers hardness of SUS301 and surrender stress (proof stress)

FIG. 9 is a graph showing a relationship between Vickers hardness of SUS301 and yield stress (proof stress) of SUS301. In FIG. 9, a horizontal axis represents Vickers hardness (HV) while a vertical axis represents proof stress N/mm2). Form FIG. 9, it is understood that the higher Vickers hardness becomes, the higher yield stress (proof stress) becomes.

In the manner described above, according to the second example, it is possible to provide the lens driving device 10 which makes impact resistant performance compatible with lens inclination (tilt) performance by using, as the material of the leaf springs, the high hardness stainless steel having Vickers hardness of 500 (HV) or more.

Figure 10:
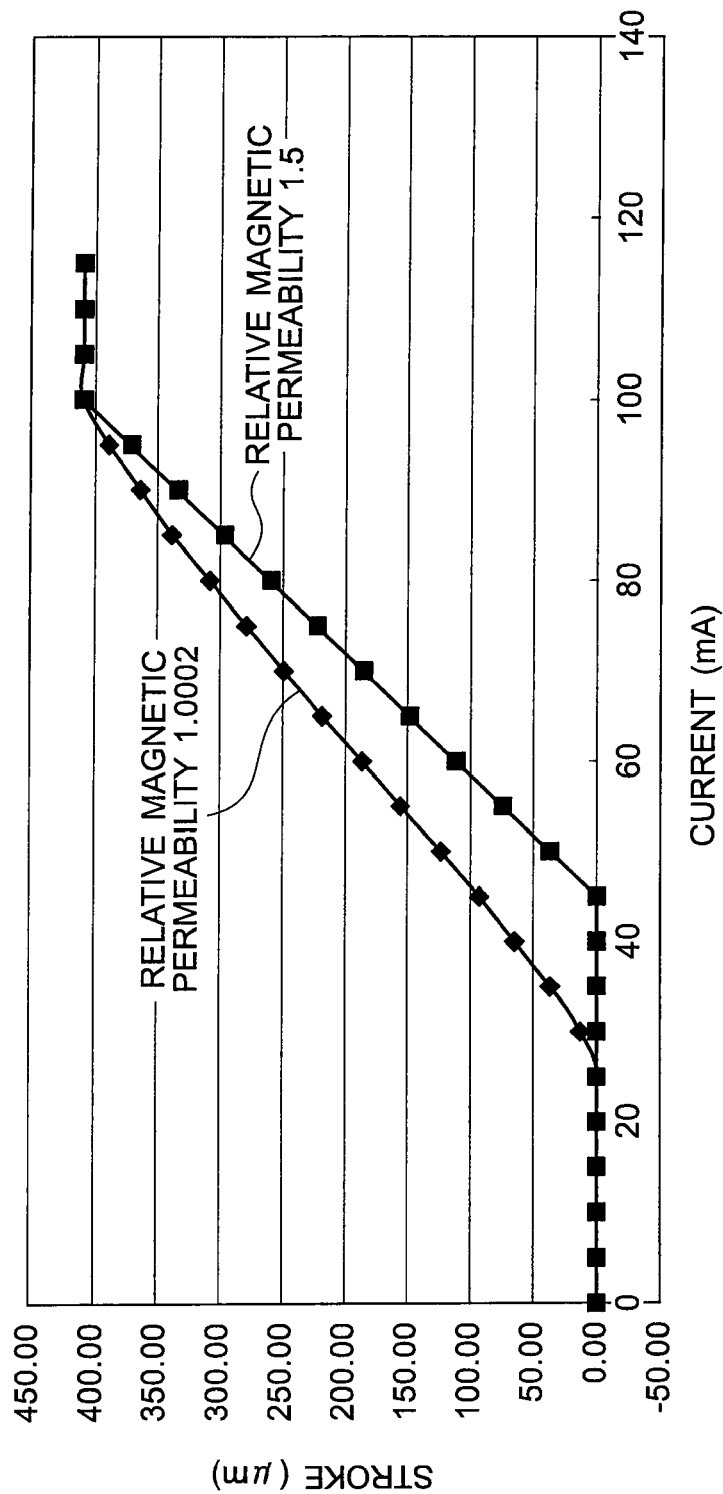
FIG. 10 is a graph showing a relationship between a current (mA) flowing in a driving coil of the lens driving device illustrated in FIG. 2 and a stroke (μm) in a case of using leaf springs having different relative magnetic permeability.

FIG. 10 shows a graph showing a relationship between a current (mA) flowing in the driving coil 16 of the lens driving device 10 shown in FIG. 2 and a stroke (μm) in a case where the leaf springs (22, 24) having different relative magnetic permeability are used.

From FIG. 10, it is understood that a starting current value in a case where the leaf springs (22, 24) having the relative magnetic permeability of 1.5 is used increases by 25 mA than another case where the leaf springs (22, 24) having the relative magnetic permeability of 1.0002 is used. In addition, it is understood that a slope in the case where leaf springs (22, 24) having the relative magnetic permeability of 1.0002 is used is equal to 6.3 while another slop in the case where leaf springs (22, 24) having the relative magnetic permeability of 1.5 is used is equal to 7.4. That is, it is understood that thrust increases in the leaf springs (22, 24) having higher relative magnetic permeability.

Figure 11:
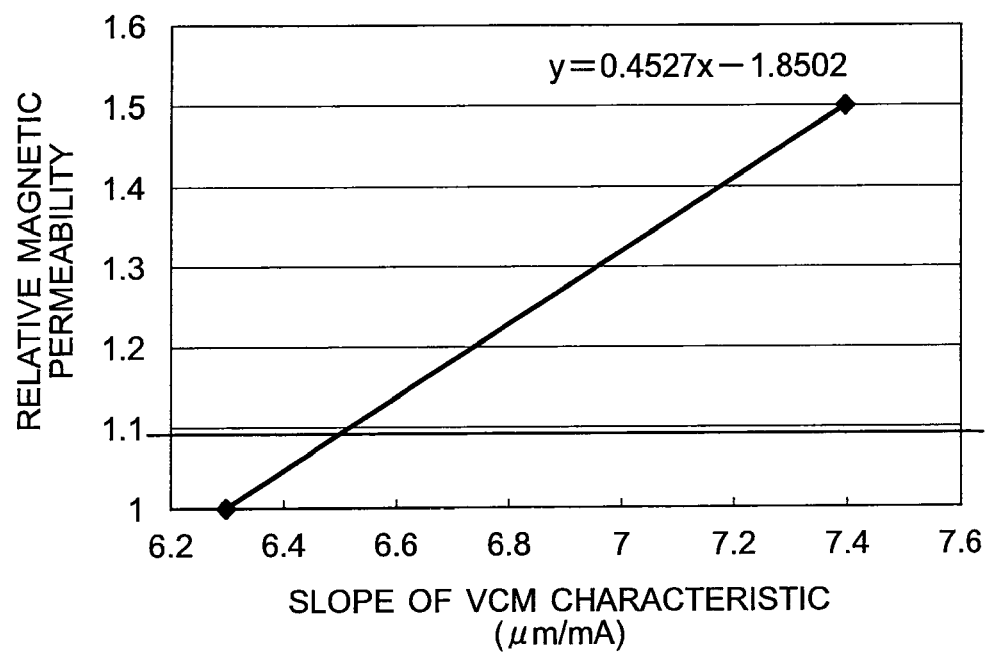
FIG. 11 is a graph showing a relationship between the relative magnetic permeability and a slop (μm/mA) of a VCM characteristic that is calculated on the basis of FIG. 10.

FIG. 11 is a graph showing relationship between relative magnetic permeability and a slop (μm/mA) of VCM characteristic that is calculated on the basis of FIG. 10. From FIG. 11, it is understood that sufficient high thrust is obtained in the leaf springs (22, 24) having the relative magnetic permeability of 1.1 or more in comparison with conventional ones having the relative magnetic permeability of about 1.

In other words, in the lens driving device 10 shown in FIG. 2, by using, as the material of the lower leaf spring 24 near to the image pickup device, the stainless steel having the relative magnetic permeability μs of 1.1 or more, it is possible to decrease leakage magnetic field at a fixed portion side and to increase the thrust in the lens driving device 10.

First through third modified examples, which will later be described, are examples where impact resistant performance is more improved on the presupposition that the high hardness non-magnetic stainless steel of the above-mentioned first example or the high hardness stainless steel of the above-mentioned second example is used as the material of the leaf springs.

Modified Example 1

Now, the description will proceed to the first modified example of the leaf springs (22, 24) according to this invention.

Figure 12:
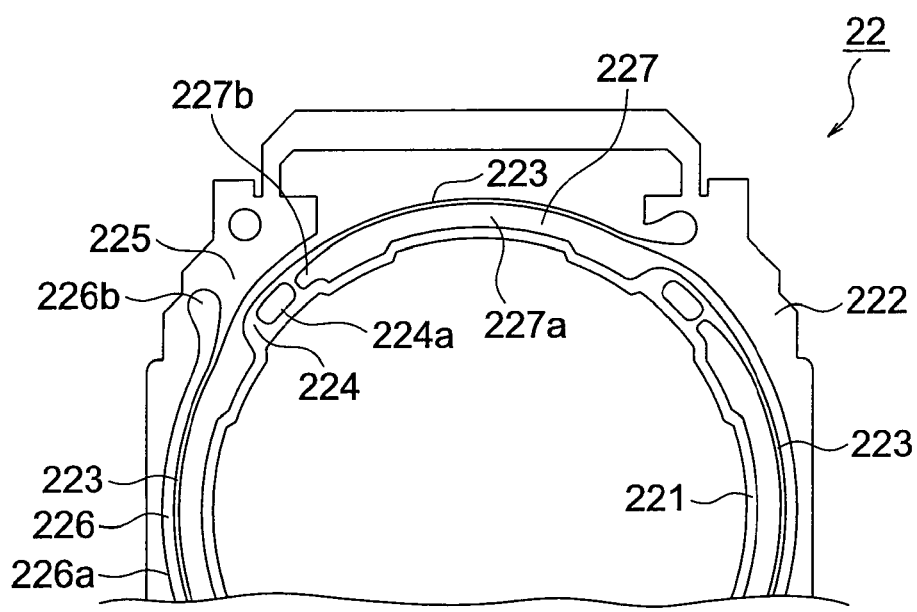
FIG. 12 is a plan view showing a main portion of an upper leaf spring (a front spring) according to a first modified example of the present invention.

FIG. 12 is a plan view showing a main portion of the upper leaf spring (the front spring) 22 according to the first modified example of the present invention. Although the lower leaf spring (the rear spring) 24 is also similar in structure to the upper leaf spring (the front spring) 22, the description thereof is omitted.

The upper leaf spring 22 has N first slits 226 each of which is formed between the outer edge portion 222 and each of the N arm portions 223. Each of the N first slits 226 comprises a first arc-shaped extending slit portion 226a formed between the outer edge portion 222 and each of the N arm portions 223 and a first basal slit portion 226b formed in the vicinity of each of the N outer coupling portions 225. The first basal slit portion 226b has a swelled shape which has a width larger than a slit width of the first arc-shaped extending slit portion 226a and which is enclosed by a curve formed so as to be apart from a basal portion of each of the N arm portions 223.

In addition, the upper leaf spring 22 has N second slits 227 each of which is formed between the inner edge portion 223 and each of the N arm portions 223. Each of the N inner coupling portions 224 has an opening 224a for mounting the inner edge portion 221 to the lens holder 14. Each of the N second slits 227 comprises a second substantially arc-shaped extending portion 227a between the inner edge portion 221 and each of the N arm portions 223 and a second basal slit portion 227b formed in the vicinity of each of the N inner coupling portions 224. The second basal slit portion 227b is formed close to the above-mentioned opening 224a to be protruded from the second substantially arc-shaped extending slit portion 227a so as to be apart from a basal portion of each of the N arm portions 223.

Inasmuch as the first and the second basal slit portions 226b and 227b are formed to both basal portions of each of the N arm portions 223, it is possible to mitigate stress applied to the both basal portions of each of the N arm portions 223 of the leaf spring 22. Accordingly, it is possible to improve impact resistant performance caused by falling of the cellular mobile phone or the like.

In addition, inasmuch as the N second basal slit portions 227b are formed close to the N openings 224a of the N inner coupling portions 224, it is possible to absorb kinks transferred from the inner edge portion 221 to the N arm portions 223 on operation.

Modified Example 2

Now, the description will proceed to the second modified example of the leaf springs according to this invention.

Figure 13:
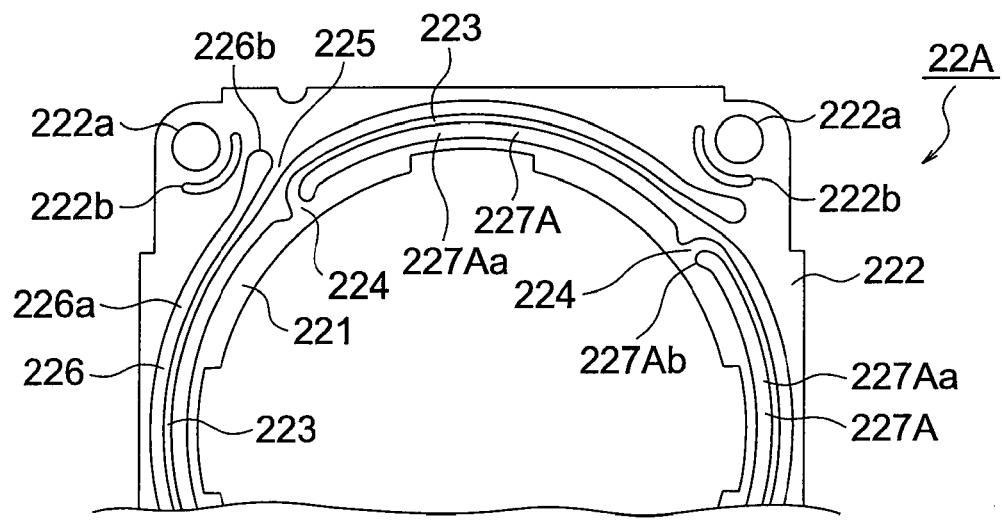
FIG. 13 is a plan view showing a main portion of an upper leaf spring (a front spring) according to a second modified example of the present invention.

FIG. 13 is a plan view showing a main portion of an upper leaf spring (a front spring) 22A according to the second modified example of the present invention. Although a lower leaf spring (the rear spring) is also similar in structure to the upper leaf spring (the front spring) 22A, the description thereof is omitted.

The illustrated upper leaf spring 22A is similar in structure to the upper leaf spring 22 shown in FIG. 12 except that a shape of the second slits is substantially different from that illustrated in FIG. 12 as will later become clear. The second slits are therefore depicted at 227A. The description will later be made about only differences from the first modified example for the sake of simplification of the description.

In the upper leaf spring 22A being illustrated in FIG. 13, the integer N is equal to four.

The outer edge portion 222 has, at four corners thereof, four circular holes 222a for mounting the outer edge portion 222 to the yoke 20. In addition, the outer edge portion 222 has four arc-shaped slits 222b formed between the four circular holes 222a and the four first basal slit portions 116b of the four first slits 226.

The four inner coupling portions 224 have no openings 224a as shown in FIG. 12.

Each of the four second slits 227A comprises a second arc-shaped extending slit portion 227Aa formed between the inner edge portion 221 and each of the four arm portions 223 and a second basal slit portion 227Ab formed in the vicinity of each of the four inner coupling portions 224. Each of the four second basal slit portions 227Ab is formed to be protruded from each of the four second arc-shaped extending slit portions 227Aa so as to be apart from each of the four arm portions 223.

Inasmuch as the first and the second basal slit portions 226b and 227Ab are formed to both basal portions of each of the four arm portions 223 and the four arc-shaped slits 222b are formed close to the four first basal slit portions 226b, it is possible to mitigate stress applied to the both basal portions of each of the four arm portions 223 of the leaf spring 22A. Accordingly, it is possible to improve impact resistant performance caused by falling of the cellular mobile phone or the like.

Modified Example 3

Now, the description will proceed to the third modified example of the leaf springs according to this invention.

Figure 14:
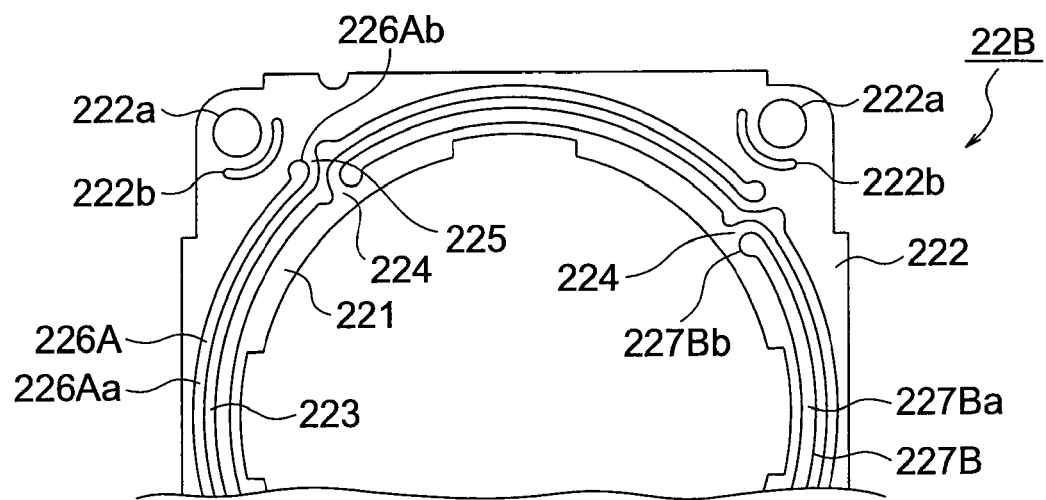
FIG. 14 is a plan view showing a main portion of an upper leaf spring (a front spring) according to a third modified example of the present invention.

FIG. 14 is a plan view showing a main portion of an upper leaf spring (a front spring) 22B according to the third modified example of the present invention. Although a lower leaf spring (a rear spring) is also similar in structure to the upper leaf spring (the front spring) 22B, the description thereof is omitted.

The illustrated upper leaf spring 22B is similar in structure to the upper leaf spring 22A shown in FIG. 13 except that shapes of the first and the second slits are substantially different from those illustrated in FIG. 13 as will later become clear. The first and the second slits are therefore depicted at 226A and 227B, respectively. The description will later be made about only differences from the second modified example for the sake of simplification of the description.

In the upper leaf spring 22B being illustrated in FIG. 14, the integer N is equal to four.

Each of the four first slits 226A comprises a first arc-shaped extending slit portion 226Aa formed between the outer edge portion 222 and each of the four arm portions 223 and a first basal slit portion 226Ab formed in the vicinity of each of the four outer coupling portions 225. The first basal slit portion 226Ab has a swelled shape which has a width larger than a slit width of the first arc-shaped extending slit portion 226Aa and which is enclosed by a curve.

Each of the four second slits 227B comprises a second arc-shaped extending slit portion 227Ba formed between the inner edge portion 221 and each of the four arm portions 223 and a second basal slit portion 227Bb formed in the vicinity of each of the four inner coupling portions 224. The second basal slit portion 227Bb has a swelled shape which has a width larger than a slit width of the second arc-shaped extending slit portion 227Ba and which is enclosed by a curve.

Inasmuch as the first and the second basal slit portions 226Ab and 227Bb are formed to both basal portions of each of the four arm portions 223 and the four arc-shaped slits 222b are formed close to the four first basal slit portions 226Ab, it is possible to mitigate stress applied to the both basal portions of each of the four arm portions 223 of the leaf spring 22B. Accordingly, it is possible to improve impact resistant performance caused by falling of the cellular mobile phone or the like.

Fourth modified example, which will later be described, is an example where lens inclination (tilt) performance is more improved on the presupposition that the high hardness non-magnetic stainless steel of the above-mentioned first example or the high hardness stainless steel of the above-mentioned second example is used as the material of the leaf springs.

Modified Example 4

Now, the description will proceed to the fourth modified example of the leaf springs according to this invention.

Figure 15:
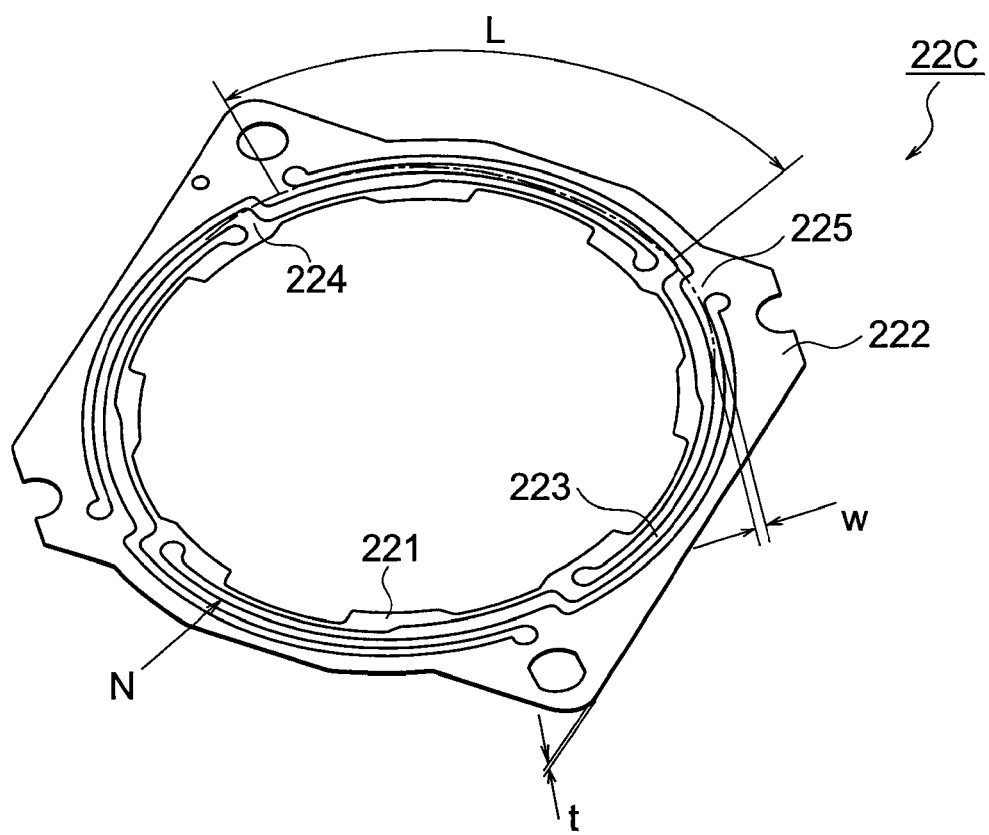
FIG. 15 is a perspective view showing an upper leaf spring (a front spring) according to a fourth modified example of the present invention.

FIG. 15 is a perspective view showing an upper leaf spring (a front spring) 22C according to the fourth modified example of the present invention. Although a lower leaf spring (a rear spring) is also similar in structure to the upper leaf spring (the front spring) 22C, the description thereof is omitted.

The illustrated upper leaf spring 22C has a plate thickness t which lies within a range between 0.03 mm and 0.08 mm, both inclusive. Each arm portion 223 has a width w which lies within a range between 0.08 mm and 0.35 mm, both inclusive. In addition, each arm portion 223 has a length L which lies within a range between 6 mm and 9 mm, both inclusive. In the illustrated upper leaf spring 22C, the arm portions 223 are equal in number N to four. However, the number N may be lain in a range between two and four, both inclusive.

Figure 16:
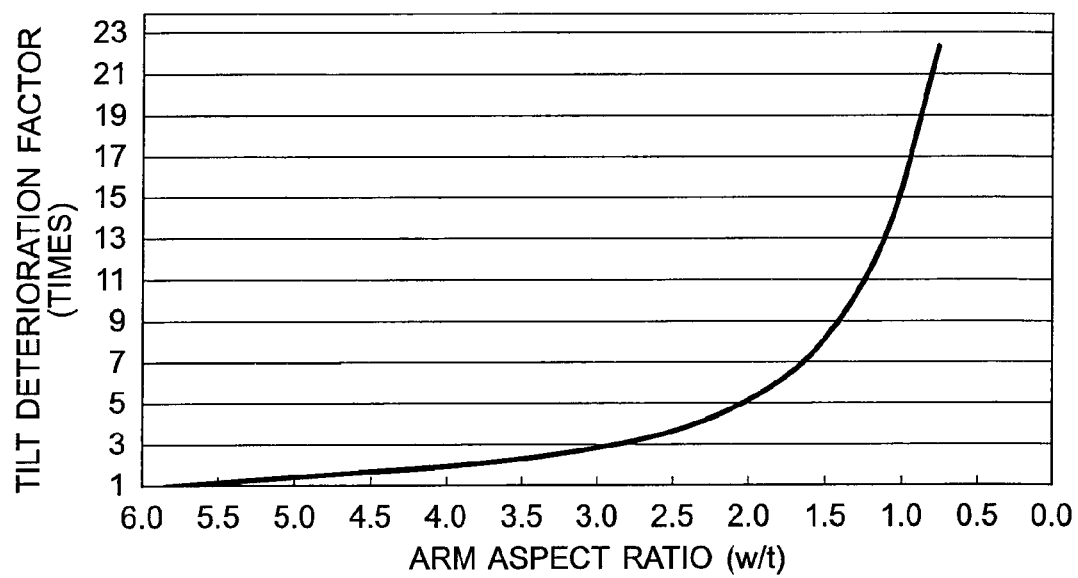
FIG. 16 is a graph showing a relationship between an arm aspect ratio (w/t) of the leaf spring illustrated in FIG. 15 and a tilt deterioration factor (times)

FIG. 16 is a graph showing a relationship between an arm aspect ratio (w/t) and a tilt deterioration factor. In FIG. 16, a horizontal axis represents the arm aspect ratio (w/t) while a vertical axis represents the tilt deterioration factor (times).

Specifically speaking, the arm aspect ratio (w/t) is equal to 6.0 when the plate thickness t of the upper leaf spring 22C is equal to 0.03 mm and the width w of each arm portion 223 is equal to 0.18 mm. FIG. 16 is the graph in a case where the tilt deterioration factor is equal to one when the arm aspect ratio (w/t) is equal to 6.0.

From FIG. 16, it is understood that the smaller the arm aspect ratio (w/t) becomes, the higher (worse) the tilt deterioration factor becomes. Specifically, it is understood that the tilt deterioration factor becomes higher gently in a case where the arm aspect ratio (w/t) lies within the range between 6.0 and 1.5, both inclusive while the tilt deterioration factor becomes worse (higher) sharply in a case where the arm aspect ratio (w/t) is less than 1.5.

Accordingly, it is understood that it is possible to improve the lens inclination (tilt) performance when the arm aspect ratio (w/t) lies in the range between 6.0 and 1.5, both inclusive.

Fifth through eighth modified examples, which will later be described, are examples where impact resistant performance is more improved on the presupposition that the high hardness non-magnetic stainless steel of the above-mentioned first example or the high hardness stainless steel of the above-mentioned second example is used as the material of the leaf springs and that the leaf spring having the arm aspect ratio (w/t) lying in the range between 6.0 and 1.5, both inclusive, in the fourth modified example is used.

Modified Example 5

Now, the description will proceed to the fifth modified example of the leaf springs according to this invention.

Figure 17:
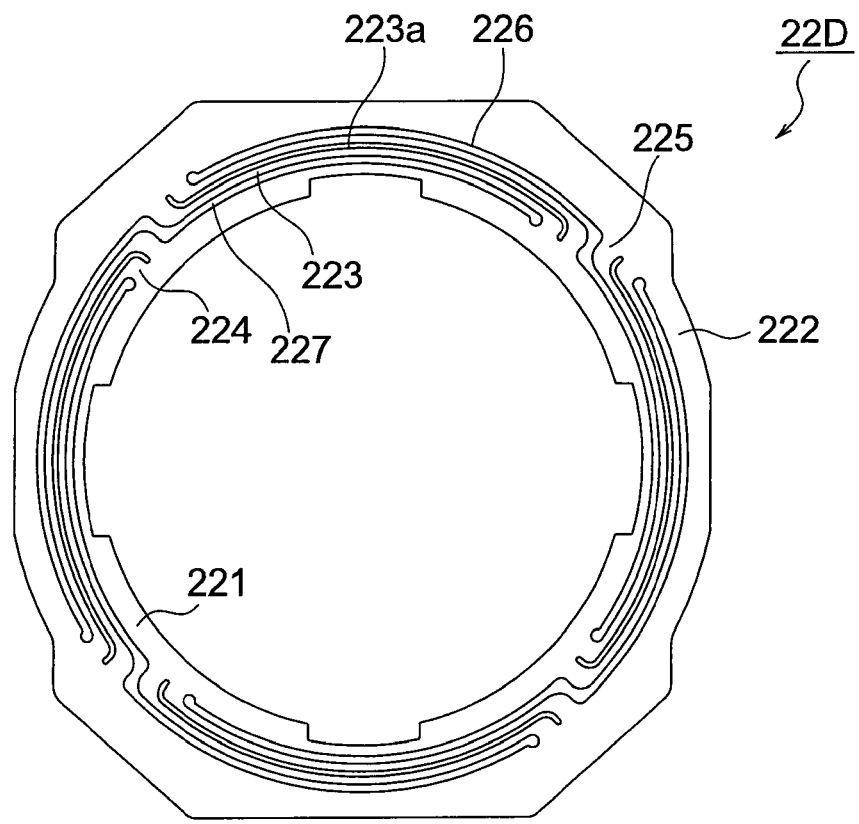
FIG. 17 is a plan view showing an upper leaf spring (a front spring) according to a fifth modified example of the present invention.
Figure 18:
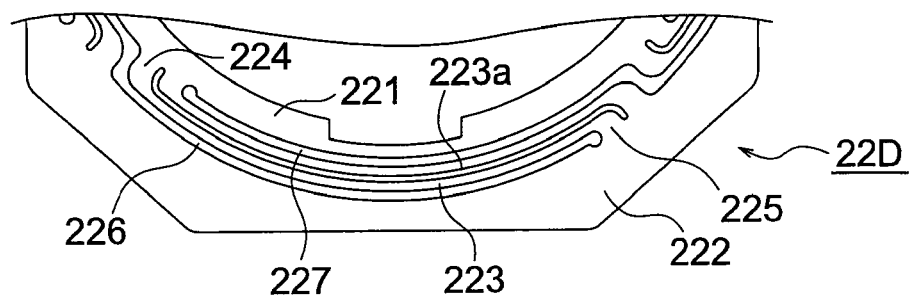
FIG. 18 is a fragmentary enlarged view showing a part of the upper leaf spring (the front spring) illustrated in FIG. 17.

FIG. 17 is a plan view showing an upper leaf spring (a front spring) 22D according to the fifth modified example of the present invention. FIG. 18 is a fragmentary enlarged view showing a part of the upper leaf spring (the front spring) 22D illustrated in FIG. 17. Although a lower leaf spring (a rear spring) is also similar in structure to the upper leaf spring (the front spring) 22D, the description thereof is omitted.

The upper leaf spring (the front spring) 22D according to the fifth modified example is similar in structure to that disclosed in the above-mentioned JP-A 2007-322540. More specifically, in the upper leaf spring 22D, each arm portion 223 has one slit 223a. The slit 223a serves as stress concentration preventing means for preventing stress concentration on both basal portions of each arm portion 223. With this structure, it is possible to improve impact resistant performance caused by falling of the cellular mobile phone or the like.

Modified Example 6

Now, the description will proceed to the sixth modified example of the leaf springs according to this invention.

Figure 19:
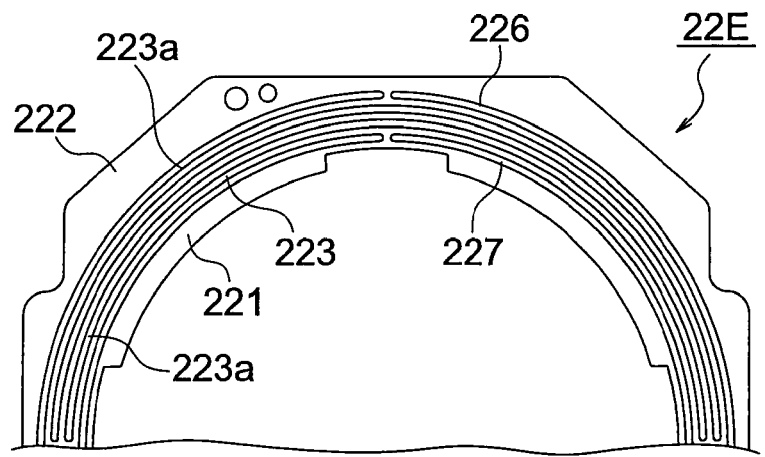
FIG. 19 is a plan view showing a part of an upper leaf spring (a front spring) according to a sixth modified example of the present invention.

FIG. 19 is a plan view showing a part of an upper leaf spring (a front spring) 22E according to the sixth modified example of the present invention. Although a lower leaf spring (a rear spring) is also similar in structure to the upper leaf spring (the front spring) 22E, the description thereof is omitted.

In the upper leaf spring 22E, each arm portion 223 has two slit 223a. The two slits 223a serve as stress concentration preventing means for preventing stress concentration on both basal portions of each arm portion 223. With this structure, it is possible to improve impact resistant performance caused by falling of the cellular mobile phone or the like.

Modified Example 7

Now, the description will proceed to the seventh modified example of the leaf springs according to this invention.

Figure 20:
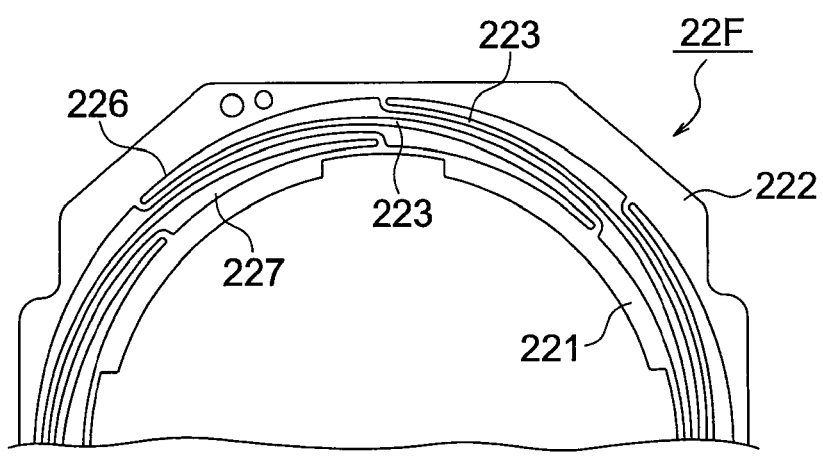
FIG. 20 is a plan view showing a part of an upper leaf spring (a front spring) according to a seventh modified example of the present invention.

FIG. 20 is a plan view showing a part of an upper leaf spring (a front spring) 22F according to the sixth modified example of the present invention. Although a lower leaf spring (a rear spring) is also similar in structure to the upper leaf spring (the front spring) 22F, the description thereof is omitted.

The illustrated upper leaf spring 22F comprises eight arm portions 223. Each arm portion 223 has an arc-shape of an angle of about 90 degrees. Each arm portion 223 is disposed so that adjacent arm portions 223 are overlapped with each other. With this structure, it is possible to prevent stress concentration on both basal portions of each arm portion 223. As a result, it is possible to improve impact resistant performance caused by falling of the cellular mobile phone or the like.

Modified Example 8

Now, the description will proceed to the eighth modified example of the leaf springs according to this invention.

Figure 21:
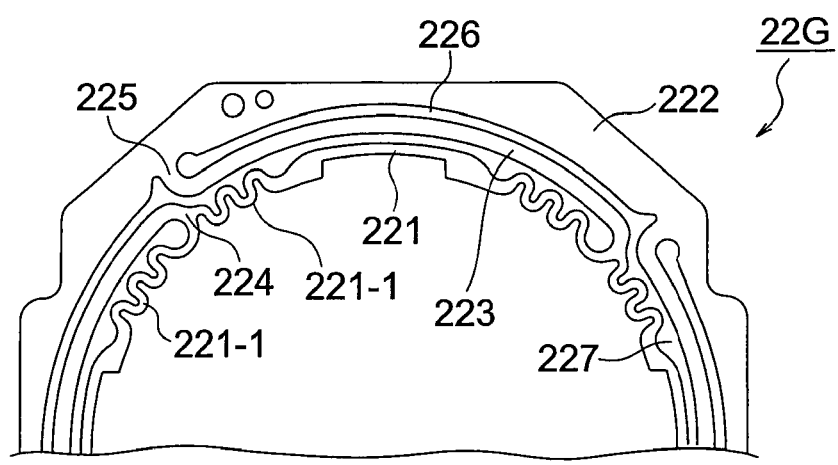
FIG. 21 is a plan view showing a part of an upper leaf spring (a front spring) according to an eighth modified example of the present invention.

FIG. 21 is a plan view showing a part of an upper leaf spring (a front spring) 22G according to the eighth modified example of the present invention. Although a lower leaf spring (a rear spring) is also similar in structure to the upper leaf spring (the front spring) 22G, the description thereof is omitted.

In the upper leaf spring 22G, the inner edge portion 221 has a plurality of bellows portions 221-1. With this structure, it is possible to prevent stress concentration on both basal portions of each arm portion 223. As a result, it is possible to improve impact resistant performance caused by falling of the cellular mobile phone or the like.

Although the bellows portions 221-1 are provided to the inner edge portion 221 in the above-mentioned eighth modified example, bellows portions may be provided to other portions. For example, the bellows portions may be provided to each arm portion 223. In other words, it is unnecessary that each arm portion 223 has a substantially arc-shape and each arm portion 223 may have various shapes.

Second Exemplary Embodiment

Figure 22:
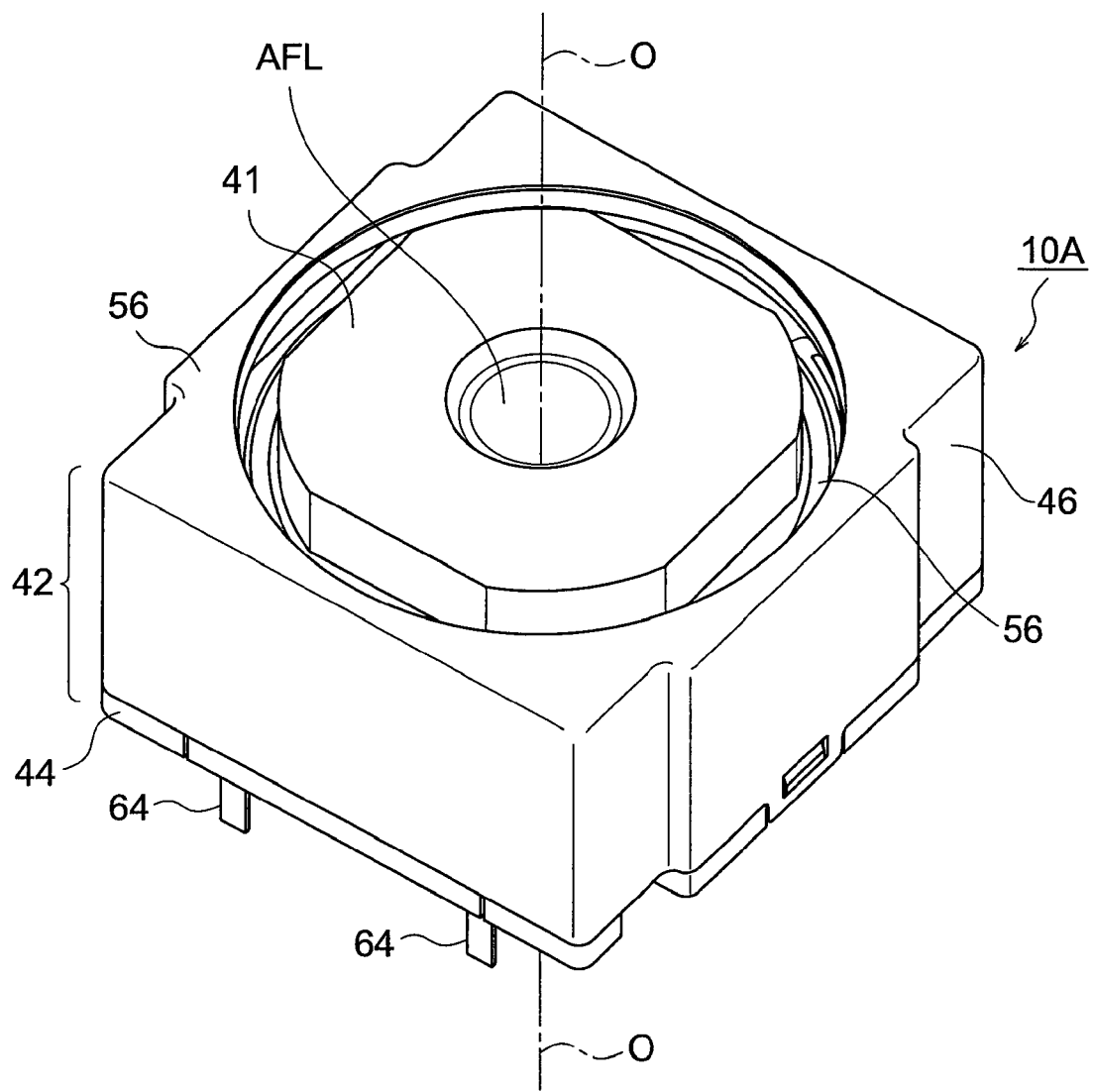
FIG. 22 is a perspective view of an appearance of a lens driving device according to a second exemplary embodiment of the present invention seen from slanting front on high.
Figure 23:
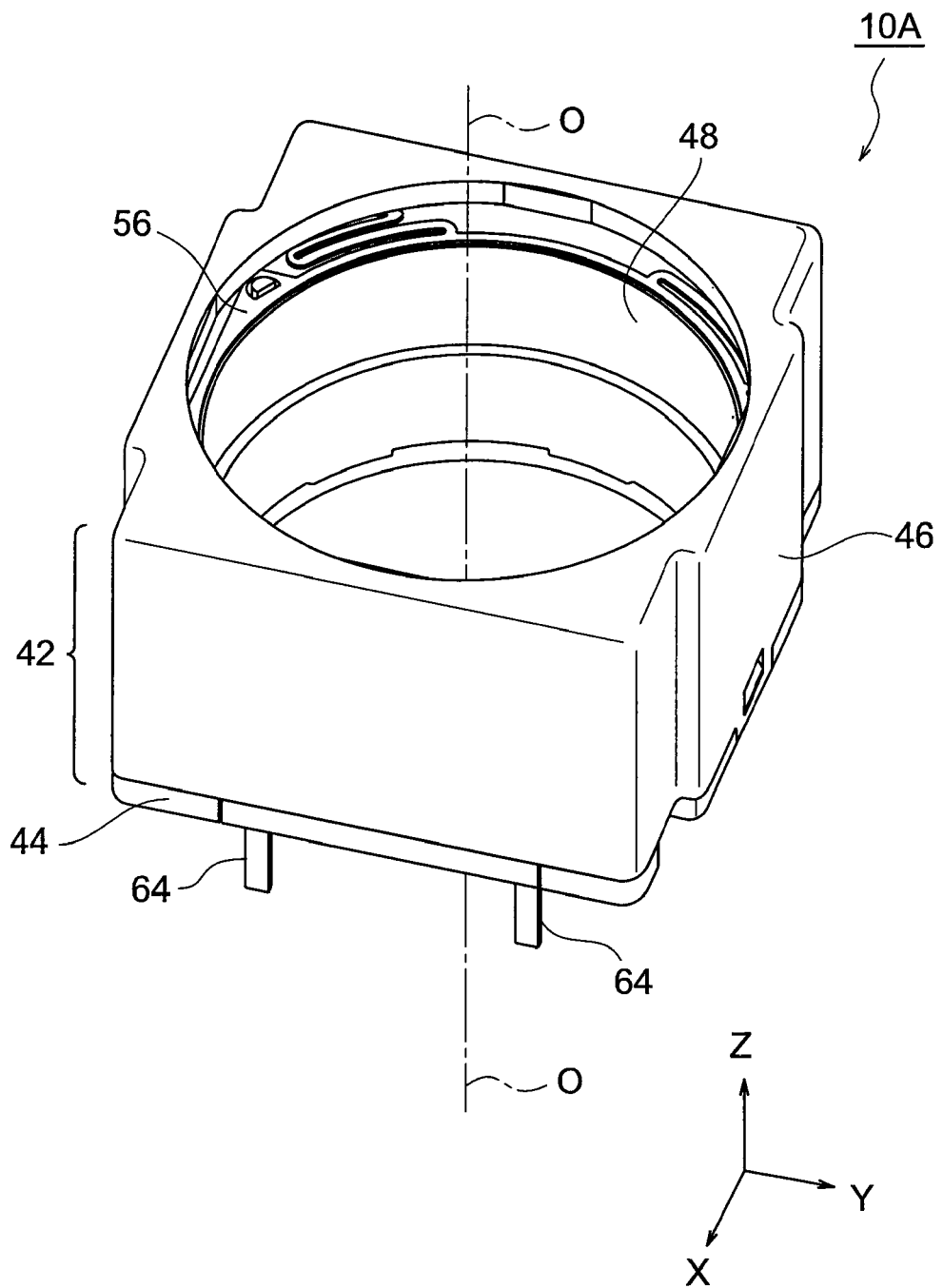
FIG. 23 is a perspective view of the lens driving device illustrated in FIG. 22 with a lens barrel omitted seen from slanting front on high.
Figure 24:
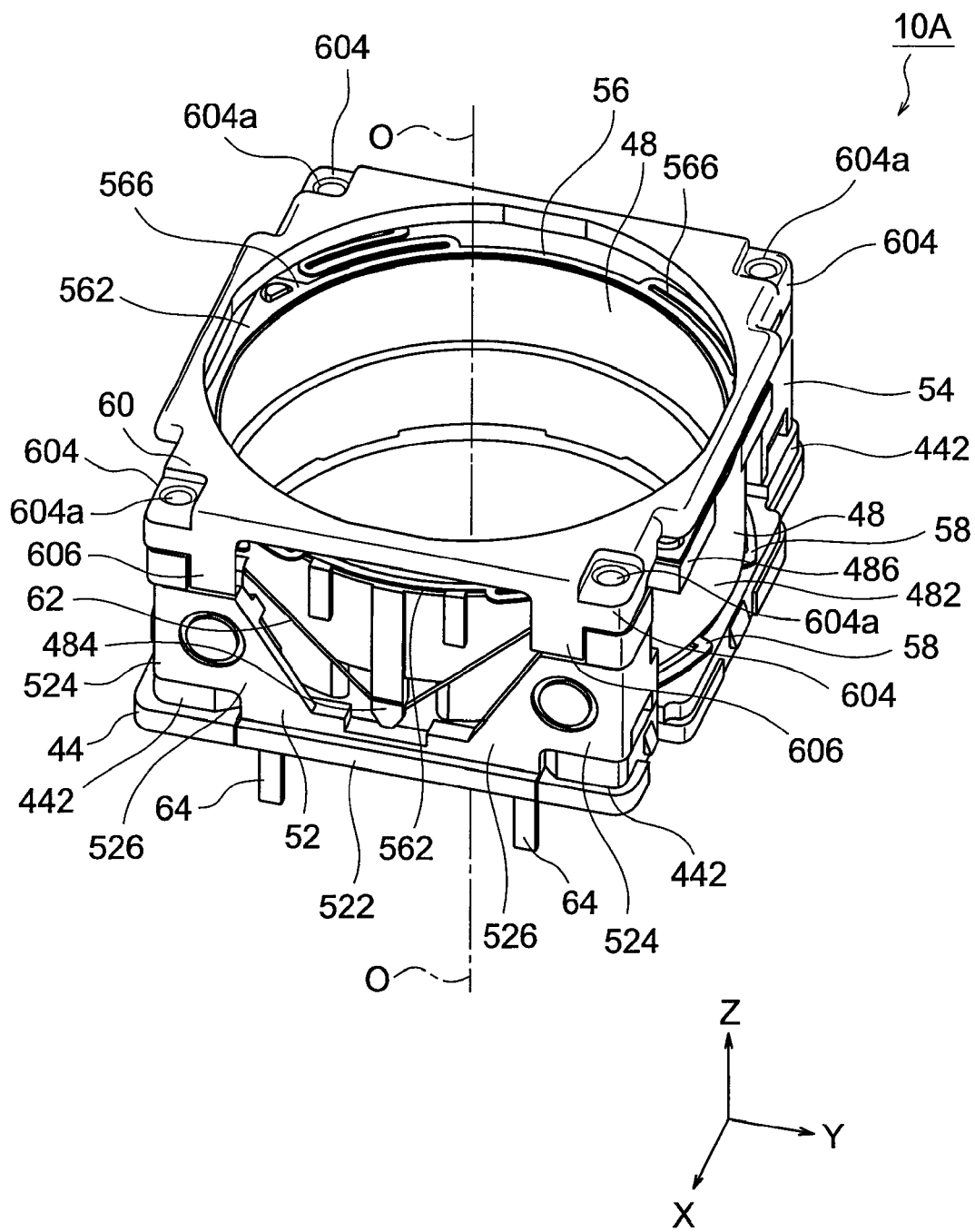
FIG. 24 is a perspective view of the lens driving device illustrated in FIG. 22 with the lens barrel and an outer upper cover omitted seen from slanting front on high.
Figure 25:
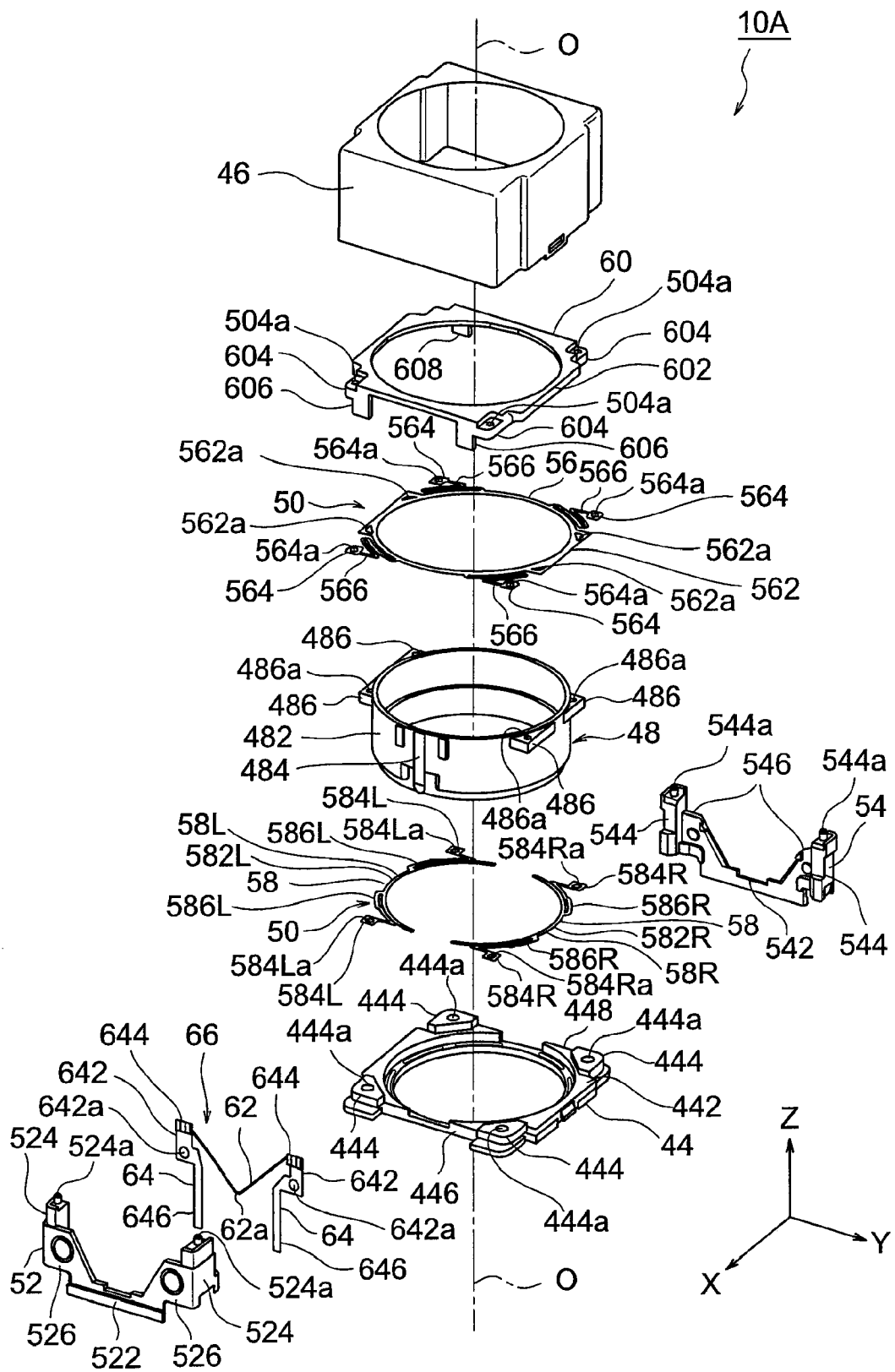
FIG. 25 is an exploded perspective view of the lens driving device illustrated in FIG. 22 with the lens barrel omitted seen from slanting front on high.
Figure 26:
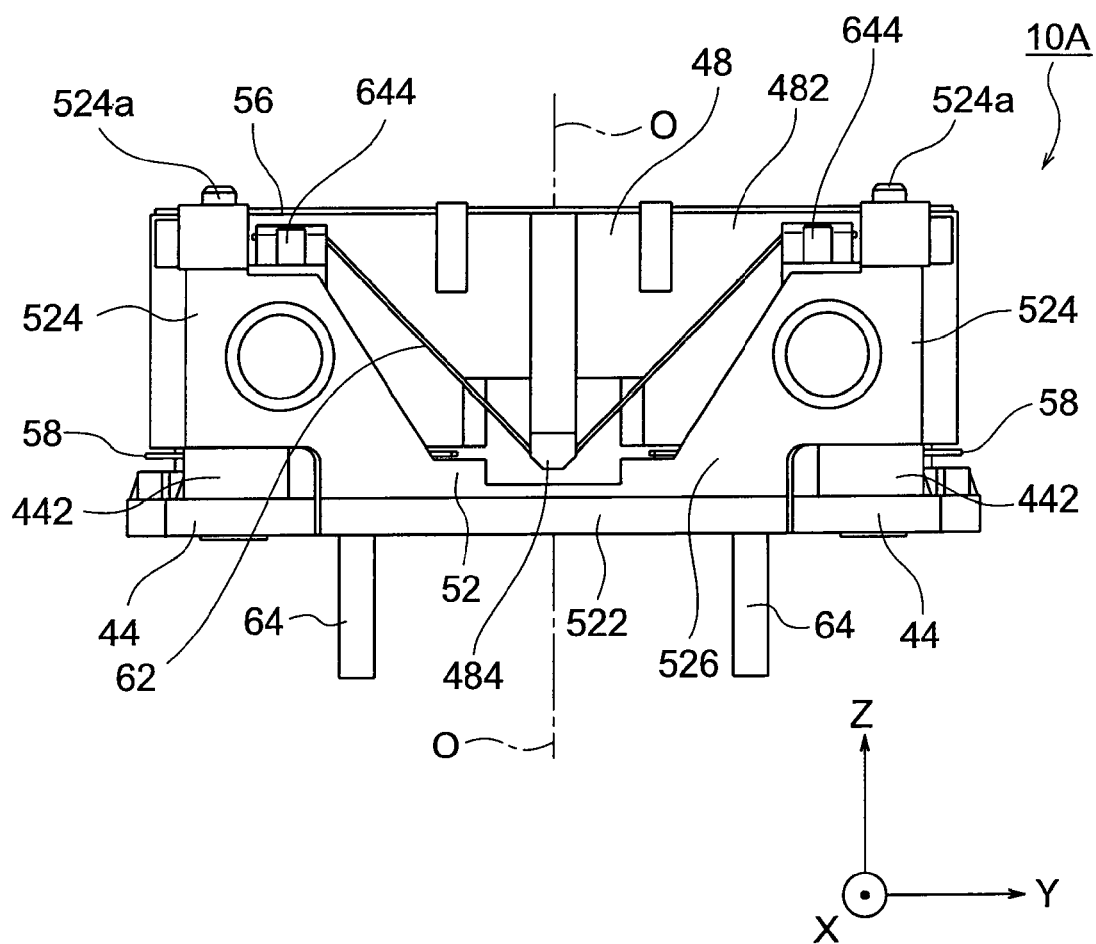
FIG. 26 is a front view of the lens driving device illustrated in FIG. 22 with the lens barrel, the outer upper cover, and an inner upper cover omitted.

Referring to FIGS. 22 through 26, the description will proceed to a lens driving device 10A according to a second exemplary embodiment of the present invention. FIG. 22 is a perspective view of an appearance of a lens driving device 10A seen from slanting front on high. FIG. 23 is a perspective view of the lens driving device 10A with a lens barrel 41 omitted seen from slanting front on high. FIG. 24 is a perspective view of the lens driving device 10A with the lens barrel 41 and an outer upper cover 46 omitted seen from slanting front on high. FIG. 25 is an exploded perspective view of the lens driving device 10A with the lens barrel 41 omitted seen from slanting front on high. FIG. 26 is a front view of the lens driving device 10A with the lens barrel 41, the outer upper cover 46, and an inner upper cover (stopper) 60 omitted.

Herein, in the manner shown in FIGS. 22 through 26, an orthogonal coordinate system (X, Y, Z) is used. In a state illustrated in FIGS. 22 through 26, in the orthogonal coordinate system (X, Y, X), an X-axis direction is a fore-and-aft direction (a depth direction), a Y-axis direction is a left-and-right direction (a width direction), and a Z-axis direction is an up-and-down direction (a height direction). In the example being illustrated in FIGS. 22 through 26, the up-and-down direction Z is a direction of an optical axis O of a lens. In addition, among the present specification, the front direction is also called a first side while the rear direction is also called a second side.

However, in an actual use situation, the direction of the optical axis O, namely, the Z-axis direction becomes a fore-and-aft direction. In other words, an upper direction of the Z-axis becomes a front direction while a lower direction of the Z-axis becomes a rear direction.

The illustrate lens driving device 10A is a lens driving device adopting, as a driving source (a driving method), a SMA method using a shape memory alloy (SMA).

The illustrated lens driving device 10A has a plane symmetric structure about a plane which runs through the optical axis O and which is defined by (extends to) the fore-and-aft direction X and the up-and-down direction Z.

The illustrated lens driving device 10A is, for example, mounted to a camera-equipped cellular mobile phone which is able to perform automatic focusing. The lens driving device 10A includes a lens barrel (a lens assembly) 41 embedding an auto-focusing lens AFL acting as a movable lens. The lens driving device 10A is for moving the lens barrel 41 in the direction of the optical axis O.

As shown in FIG. 22, the lens driving device 10A comprises a cabinet (housing) 42 having a substantially rectangular parallelepiped shape that covers the lens barrel 41. In other words, the lens barrel 41 is disposed in the cabinet (housing) 42. The cabinet (housing) 42 includes an actuator base 44 and an outer upper cover 46.

Although illustration is not made, the actuator base 44 has a central portion on which an image pickup device disposed on a module board is mounted. The image pickup device picks up a subject image formed by the movable lens AFL to convert it into an electric signal. The image pickup device may, for example, comprise a CCD (charge coupled device) type image sensor, a CMOS (complementary metal oxide semiconductor) type image sensor, or the like.

The lens driving device 10A includes a lens holder 48 for holding the above-mentioned lens barrel 41. In other words, the lens barrel 41 is held and fixed in the lens holder 48. Specifically, the lens holder 48 includes a tubular portion 482 having a substantially cylindrical shape. The tubular portion 482 of the lens holder 48 has an inner wall in which a female screw thread (not shown) is cut. On the other hand, the lens barrel 41 has an outer wall in which male screw thread (not shown) screwed in the above-mentioned female screw thread is cut. In a case of fitting the lens barrel 41 to the lens holder 48, it includes the steps of rotating the lens barrel 41 with respect to the lens holder 48 around the optical axis O to crew it along the direction of the optical axis O thereby accommodating the lens barrel 41 in the lens holder 14, and of connecting them to each other via an adhesive agent or the like.

The lens holder 48 is supported in the housing 42 so as to be movable in the direction of the optical axis O alone in the manner which will later be described. A combination of the lens barrel 41 and the lens holder 48 serves as a lens movable portion (41, 48).

The tubular portion 482 of the lens holder 48 comprises, on the outer wall thereof, a protruding portion 484 which protrudes in a radial direction outwardly forward of the fore-and-aft direction X. The protruding portion 484 protrudes along the up-and-down direction Z from an up end of the tubular portion 482 toward a lower end thereof. The protruding portion 484 is for hanging a mid portion 62a of a shape memory alloy wire 62 formed in linear that will be later described. Accordingly, the protruding portion 484 is also called a hanging protrusion.

The actuator base 44 comprises a ring-shaped base portion 442 and four base protruding portions 444 which slightly protrude from the base portion 442 at four corners thereof in the up-and-down direction upwardly. The four base protruding portions 444 have four base protrusions 444a, respectively, each of which protrudes upwardly. In the four base protruding portions 444, a front concave portion 446 is formed between front two base protruding portions 444 while a rear concave portion 448 is formed between rear two base protruding portions 444.

The cabinet (housing) 42 further comprises a front supporting member 52 and a rear supporting member 54. The front supporting member 52 is mounted on the actuator base 44 at the front thereof while the rear supporting member 54 is mounted on the actuator base 44 at the rear thereof. The front supporting member 52 and the rear supporting member 54 have a substantially similar shape. The front supporting member 52 and the rear supporting member 54 are disposed so as to be plane symmetric with respect to a plane which runs through the optical axis O and which is defined by (extends to) the left-and-right direction Y and the up-and-down direction Z. In other words, the front supporting member 52 and the rear supporting member 54 are related as object and mirror image with respect to the above-mentioned plane.

The front supporting member 52 is also called a first supporting member while the rear supporting member 54 is also called a second supporting member. The first and the second supporting members are also collectively called a supporting member simply.

In addition, the front supporting member 52 is also called an electrode holder because it is for holding a pair of electrodes 64 which will later be described.

The front supporting member (the electrode holder) 52 comprises a front base portion 522 inserted in the front concave portion 446 of the actuator base 44, a pair of front supporting protruding portions 524 mounted on a pair of front base protruding portions 444 of the actuator base 44, and a pair of front supporting coupling portions 526 for coupling both end portions of the front base portion 522 with the pair of front supporting protruding portions 524. The pair of front supporting protruding portions 524 protrudes upwardly and has a pair of front supporting protrusions 524a, respectively, which protrudes upwardly. Although the illustration is not made, the pair of front supporting protruding portions 524 has, at a base portion thereof, a pair of front supporting holes in which the pair of base protrusions 444a protruded from the pair of front base protruding portions 444 is inserted. In the manner which will later be described, the pair of electrodes 64 is held at the pair of front supporting coupling portions 526.

Likewise, the rear supporting member 54 comprises a rear base portion 542 inserted in the rear concave portion 448 of the actuator base 44, a pair of rear supporting protruding portions 544 mounted on a pair of rear base protruding portions 444 of the actuator base 44, and a pair of rear supporting coupling portions 546 for coupling both end portions of the rear base portion 542 with the pair of rear supporting protruding portions 544. The pair of rear supporting protruding portions 544 protrudes upwardly and has a pair of rear supporting protrusions 544a, respectively, which protrudes upwardly. Although the illustration is not made, the pair of rear supporting protruding portions 544 has, at a base portion thereof, a pair of rear supporting holes in which the pair of base protrusions 444a protruded from the pair of rear base protruding portions 444 is inserted.

The lens driving device 10A comprises an upper leaf spring 56 and a lower leaf spring 58 which are disposed to both sides of the tubular portion 482 of the lens holder 48 in the direction of the optical axis O. The upper leaf spring 56 and the lower leaf spring 58 are disposed between the lens holder 48 and the housing 42 and serve as a supporting member 50 for supporting the lens holder 48 in the direction of the optical axis O shiftably so as to position the lens holder 48 in a radial direction.

In the example being illustrated, the lower leaf spring 58 comprises a pair of lower leaf spring segments 58R and 58L, as shown in FIG. 25.

In addition, in the manner which is described above, in the actual use situation, the upper direction in the Z-axis direction (the direction of the optical axis O) becomes the front direction while the lower direction in the Z-axis direction (the direction of the optical axis O) becomes the rear direction. Accordingly, the upper leaf spring 56 is also called a front-side spring while the lower leaf spring 58 is also called a rear-side spring.

Either of the upper leaf spring (the front-side spring) 56 and the lower leaf spring (the rear-side spring) 58 is made of metal of the special stainless steel which is described in the above-mentioned first example or the above-mentioned second example. In addition, the upper leaf spring (the front-side spring) 56 and the lower leaf spring (the rear-side spring) 58 are manufactured by a press working against a predetermined thin plate or an etching working using photolithography technique. The etching working is desirable than the press working. This is because residual stress does not remain in the leaf spring in the etching working.

The upper leaf spring 56 is disposed at an upper side of the lens holder 48 in the direction of the optical axis O while the lower leaf spring 48 is disposed at a lower side of the lens holder 48 in the direction of the optical axis O.

The upper leaf spring 56 comprises an upper ring portion 562 mounted on the lens holder 48 and four upper end portions 564 mounted to the housing 42 at four corners thereof in the manner which will later be described. Between the upper ring portion 562 and the four upper end portions 564, four upper arm portions 566 are provided. That is, the four upper arm portions 566 connect the upper ring portion 562 to the four upper end portions 564, respectively.

The upper ring portion 562 of the upper leaf spring 56 is fixed to the tubular portion 482 of the lens holder 48. More specifically, the lens holder 48 comprises four upper holder protruding portions 486 which protrude from an upper end of the tubular portion 482 in the radial direction outwardly. The four upper holder protruding portions 486 have four upper holder protrusions 486a, respectively, which protrude upwardly. The upper ring portion 562 of the upper leaf spring 56 has four upper spring holes 562a in which the four upper holder protrusions 486a are inserted, respectively.

On the other hand, the four upper end portions 564 of the upper leaf spring 56 are fixed to the pair of front supporting protruding portions 524 of the front supporting member 52 and the pair of rear supporting protruding portions 544 of the rear supporting member 54. More specifically, the four upper end portions 564 of the upper leaf spring 56 have four upper end holes 564a, respectively, in which the pair of front supporting protrusions 524a formed on the pair of front supporting protruding portions 524 and the pair of rear supporting protrusions 544a formed on the pair of rear supporting protruding portions 544 are fitted. The housing 42 further comprises an inner upper cover 60 which is made of resin and which is provided inside the outer upper cover 46. By the inner upper cover 60, the four upper end portions 564 of the upper leaf spring 56 are fixed.

More specifically, the inner upper cover 60 comprises a ring-shaped inner cover body 602, four engagement protruding portions 604 which slightly protrude from the inner cover body 602 at four corners thereof downwardly, a pair of front extending portions 606 extending in the vicinity of a pair of front engagement protruding portions 604 downwardly, and a pair of rear extending portions 608 extending in the vicinity of a pair of rear engagement protruding portions 604 downwardly. The four engagement protruding portions 604 have four though holes 604a, respectively, in which the pair of front supporting protrusions 524a of the front supporting member 52 and the pair of rear supporting protrusions 544a of the rear supporting member 54 are inserted. Accordingly, the four upper end portions 564 of the upper leaf spring 56 are fixed with they sandwiched between the four engagement protruding portions 604 of the inner upper cover 60 and the pair of front supporting protruding portions 542 of the front supporting member 52 and the pair of rear supporting protruding portions 544 of the rear supporting member 54. The inner upper cover 60 is also called a stopper because it has a function for preventing the upper leaf spring 56 from detaching from the front supporting member 52 and the rear supporting member 54.

Accordingly, the housing 42 comprises the actuator base 44, the outer upper cover 46, the front supporting member (the electrode holder) 52, the rear supporting member 54, and the inner upper cover (the stopper) 60.

In the pair of lower leaf spring segments 58R and 58L, one 58R is provided at a right side in the left-and-right direction Y while another 58L is provided at a left side in the left-and-right direction Y. Accordingly, the lower leaf spring segment 58R is called a right-side lower leaf spring segment while the lower leaf spring segment 58L is called a left-side lower leaf spring segment. The pair of lower leaf spring segments 58R and 58L is disposed so as to be plane symmetric with respect to a plane which runs through the optical axis O and which is defined by (extends in) the fore-and-aft direction X and the up-and-down direction Z. In other words, the right-side lower spring segment 58R and the left-side lower spring segment 58L are related as object and mirror image with respect to the above-mentioned plane.

The right-hand lower spring segment 58R comprises a lower arc portion 582R which extends in the fore-and-aft direction X as an arc-shape at the right and a pair of lower end portions 584R provided at two corners in the fore-and-aft direction X of the right. A pair of lower arm portions 586R is provided between the lower arc portion 582R and the pair of the lower end portions 584R. That is, the pair of lower arm portions 586R connects the lower arc portion 582R and the pair of lower end portions 584R. The pair of lower end portions 584R has a pair of lower end portion holes 584Ra in which a pair of right-side base protrusions 444a among the four base protrusions 444a of the actuator base 44 is fitted. Accordingly, the pair of lower end portions 584R of the right-side lower leaf spring segment 58R is fixed with they sandwiched between the pair of right-side base protruding sections 444 of the actuator base 44 and the right-side front protruding portion 524 of the front supporting member 52 and the right-side rear protruding portion 544 of the rear supporting member 54. The lower arc portion 582R of the right-side lower spring segment 58R is mounted on a lower end of the tubular portion 482 of the lens holder 48 at the right thereof.

Likewise, the left-hand lower spring segment 58L comprises a lower arc portion 582L which extends in the fore-and-aft direction X as an arc-shape at the left and a pair of lower end portions 584L provided at two corners in the fore-and-aft direction X of the left. A pair of lower arm portions 586L is provided between the lower arc portion 582L and the pair of the lower end portions 584L. That is, the pair of lower arm portions 586L connects the lower arc portion 582L and the pair of lower end portions 584L. The pair of lower end portions 584L has a pair of lower end portion holes 584La in which a pair of left-side base protrusions 444a among the four base protrusions 444a of the actuator base 44 is fitted. Accordingly, the pair of lower end portions 584L of the left-side lower leaf spring segment 58L is fixed with they sandwiched between the pair of left-side base protruding sections 444 of the actuator base 44 and the left-side front protruding portion 524 of the front supporting member 52 and the left-side rear protruding portion 544 of the rear supporting member 54. The lower arc portion 582L of the left-side lower spring segment 58L is mounted on a lower end of the tubular portion 482 of the lens holder 48 at the left thereof.

The elastic member 50 comprising the upper leaf spring 56 and the lower leaf spring 58 serves as a guide unit for guiding the lens holder 48 so as to enable the lens holder 48 to move only in the direction of the optical axis O. Each of the upper leaf spring 56 and the lower leaf spring 58 is made of the special stainless steel described in the above-mentioned first example or the above-mentioned second example as described above.

With this structure, the lens movable portion (41, 48) can move in the direction of the optical axis O alone with respect to the cabinet (the housing) 42.

In the above-mentioned lens driving device 10A, the lens holder 48 including the tubular portion 482 for holding the lens barrel 41 serves as a pillar shaped movable portion (41, 48) disposed in a center portion. In addition, the housing 42 comprising the actuator base 44, the outer upper cover 46, the front supporting member (the electrode holder) 52, the rear supporting member 54, and the inner upper cover (the stopper) 60 serves as a cylindrical fixed portion disposed around the movable portion (41, 48).

The lens driving device 10A comprises the shape memory alloy (SMA) wire 62 which is formed in linear and which is disposed in the vicinity of an outer wall of the tubular portion 482 of the lens holder 48 and a pair of electrodes 64 which is electrically connected to both ends of the SMA wire 62. A combination of the SMA wire 62 and the pair of electrodes 64 is called a shape memory alloy (SMA) assembly 66. The SMA assembly 66 is held to the front supporting member (the electrode holder) 52 in the manner which will later be described.

Figure 27:
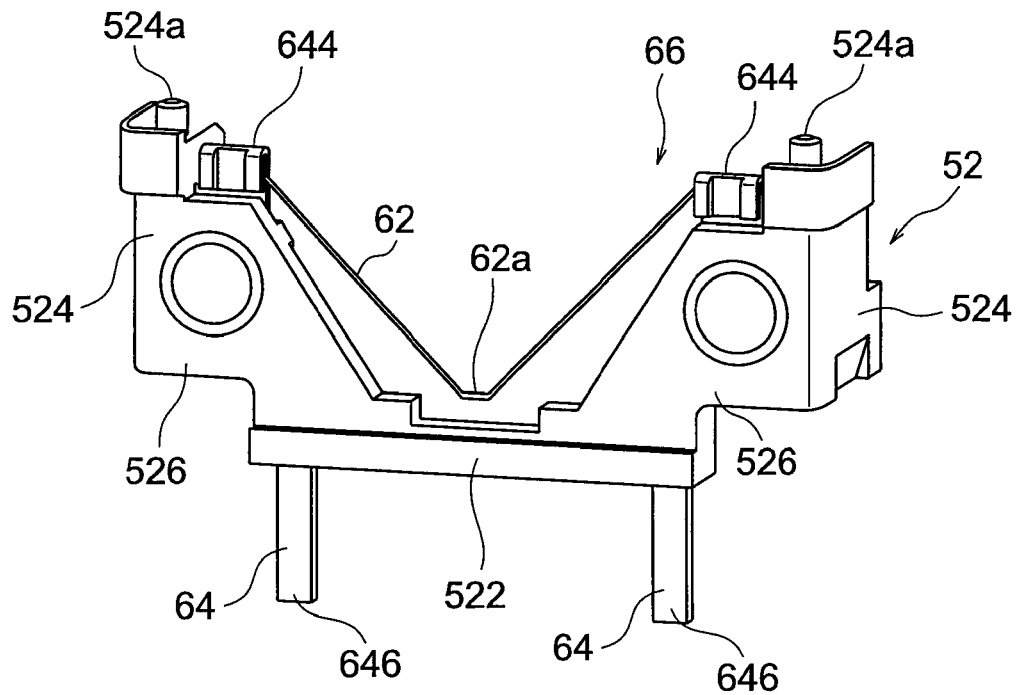
FIG. 27 is a perspective view of a state where a SAM assembly is mounted to an electrode holder seen from slanting front on high.
Figure 28:
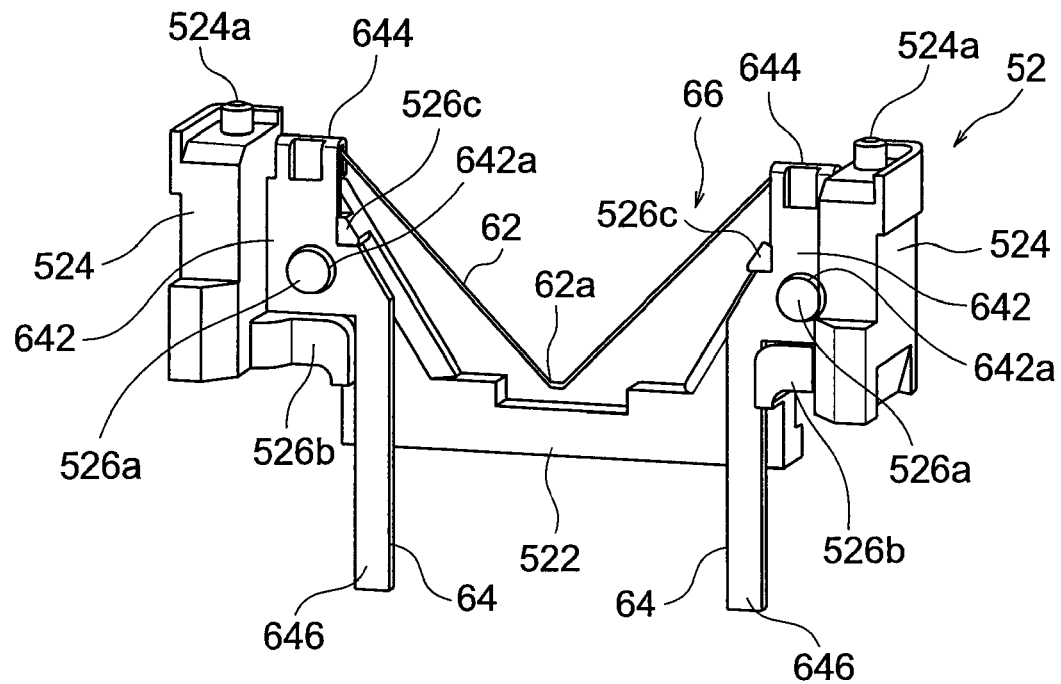
FIG. 28 is a perspective view of the state illustrated in FIG. 27 seen from slanting rear on high.
Figure 28:
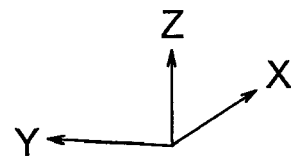

Referring to FIGS. 27 and 28, the description will proceed to a state where the SMA assembly 66 is mounted to the front supporting member (the electrode holder) 52. FIG. 27 is a perspective view of the state where the SAM assembly 66 is mounted to the electrode holder 52 seen from slanting front on high. FIG. 28 is a perspective view of the state where the SAM assembly 66 is mounted to the electrode holder 52 seen from slanting rear on high.

The pair of electrodes 64 has shapes which are bilaterally symmetrical. The pair of electrodes 64 substantially extends in the up-and-bottom direction Z. Each electrode 64 comprises a substantially L-shaped held portion 642 held in the front supporting coupling portion 526, a connecting portion 644 bent at an upper portion of the held portion 642 in U-shape in cross section, a strip-shaped terminal portion 646 extending from an inner end portion of the held portion 642 downwardly. Each electrode 64 is electrically connected to the end of the shape memory alloy wire 62 by swaging the connecting portion 644. The terminal portion 646 is for receiving supply of a driving current from a driving circuit (not shown).

As shown in FIG. 28, the held portion 642 of the electrode 64 is held in the front supporting coupling portion 526 of the electrode holder 52 at a back thereof. The held portion 642 has a circular hole 642a.

As shown in FIG. 28, the front supporting coupling portion 526 has a circular cylindrical first protruding portion 526a protruding from a back thereof in a rear direction so as to fit in the circular hole 642a of the held portion 642. In addition, the front supporting portion 526 has a second protruding portion 526b protruding from a back thereof in the rear direction so as to engage to a bottom portion of the held portion 642. Furthermore, the front supporting coupling portion 526 has a substantially triangle pillar-shaped third protruding portion 526c protruding from a back thereof in the rear direction so as to engage to a L-shaped inner bending portion of the held portion 642. The held portion 642 of the electrode 64 has an outer surface which is engaged to an inner wall of the front supporting protruding portion 524 of the electrode holder 52.

In the manner which is described above, the SMA assembly 66 is mounted to the front supporting member (the electrode holder) 52. In addition, the shape memory alloy wire 62 has the mid portion 62a which is hanged to the protruding portion (the hanging protrusion) 484 of the lens holder 48. That is, the shape memory alloy wire 62 is hanged under a tension between the lens holder 48 and the housing 42.

Now, the description will proceed to a brief operation of the lens driving device 10A.

In the manner which is well known in the art, "shape memory alloy" is metal having the property where pre-lent deformed distortion becomes zero in a particular temperature range to recover to an original shape. The shape memory alloy may be, for example, NiTi alloy.

The illustrated shape memory alloy wire 62 comprises a type of wire where it contracts to a pre-memorized contract length when it self-heats due to energization while it recovers to a predetermined original length (a length of a slackened state) caused by natural cooling when the energization stops.

The above-mentioned elastic member 50 acts so as to urge the lens holder 48 along the direction of the optical axis O downwardly. On the other hand, the shape memory alloy wire 62 contracts when it is energized through the pair of electrodes 64 by the driving circuit (not shown). As a result, the lens holder 48 moves along the direction of the optical axis O upward against an urging force of the elastic member 50 downward.

On the other hand, when the energization to the shape memory alloy wire 62 stops, the shape memory alloy wire 62 is cooled naturally. As a result, the shape memory alloy wire 62 expands due to the urging force of the elastic member 50 downward. Therefore, the lens holder 48 moves along the direction of the optical axis O downward.

That is, the shape memory alloy wire 62 serves as a moving unit for moving the lens holder 48 in the direction of the optical axis O by expanding and contracting thereof in the direction of the optical axis O due to temperature change caused by energization/non-energization thereof.

A combination of the elastic member 50 and the SMA assembly 66 serves as a lens driving portion (50, 66) for driving the lens movable portion (41, 48) with the lens movable portion (41, 48) supported so as to enable it to move in the direction of the optical axis O.

The lens driving portion (50, 66) and the lend movable portion (41, 48) are put side by side with respect to the optical axis O as shown in FIG. 24. Accordingly, it is possible to be short the lens driving device 10A in stature.

The lens driving device 10A according to the second exemplary embodiment of the present invention uses, as the material of the leaf springs (56, 58), a material having Vickers hardness which is not less than 500 (HV). With this structure, it is possible to provide the lens driving device 10A which is compatible impact resistant performance with lens inclination (tilt) performance.

In the leaf spring according to the exemplary aspect of this invention, the material of the leaf spring may be preferably made of stainless steel.

The above-mentioned leaf spring may, for example, comprise an inner edge portion having an annular shape, an outer edge portion which is apart from the inner edge portion and which has a larger radius than the inner edge portion, N arm portions disposed along a circumferential direction in order to connect the inner edge portion and the outer edge portion, where N represents an integer which is not less than two, N inner coupling portions coupling the inner edge portion and the N arm portions, and N outer coupling portions coupling the outer edge portion and the N arm portions. The leaf spring may have N first slits each formed between the outer edge portion and each of the N arm portions, and N second slits each formed between the inner edge portion and each of the N arm portions. In this event, each of the N first slits may comprise a first arc-shaped extending slit portion formed between the outer edge portion and each of the N arm portions, and a first basal slit portion formed in the vicinity of each of the N outer coupling portions, while each of the N second slits may comprise a second substantially arc-shaped extending slit portion formed between the inner edge portion and each of the N arm portions, and a second basal slit portion formed in the vicinity of each of the N inner coupling portions.

In the above-mentioned leaf spring, the first basal slit portion may preferably have a swelled shape which has a width larger than a slit width of the first arc-shaped extending slit portion and which is enclosed by a curve formed so as to be apart from a basal portion of each of the N arm portions. In addition, each of said N inner coupling portions may have an opening for mounting the inner edge portion to the movable portion. In this event, the second basal slit portion may be formed close to the opening to be protruded from the second substantially arc-shaped extending slit portion so as to be apart from a basal portion of each of the N arm portions. In addition, the second basal slit portion may be desirably formed to be protruded from the second substantially arc-shaped extending slit portion so as to be apart from each of the N arm portions. The outer edge portion may have a circular hole formed at a corner thereof to mount the outer edge portion to the fixed portion and an arc-shaped slit formed between the circular hole and the first basal slit portion. The first basal slit portion may have a swelled shape which has a width larger than a slit width of the first arc-shaped extending slit portion and which is enclosed by a curve, while the second basal slit portion may have a swelled shape which is width larger than a slit width of the second substantially arc-shaped extending slit portion and which is enclosed by a curve.

In addition, in the above-mentioned leaf spring, an arm aspect ratio (w/t) may be preferably lain in a range between 6.0 and 1.5, both inclusive, where t represents a plate thickness of the plate spring and w represents a width of each of the N arm portions. The integer N may desirably lie in a range between two and four, both inclusive. Each of the N arm portions may preferably have at least one slit. Adjacent arm portions may be disposed to be overlapped with each other. The inner edge portion may include a bellows portion.

A lens driving device according to a first exemplary aspect of this invention is a lens driving device adopting a VCM method where a voice coil motor (VCM) uses as a driving source. The lens driving device includes a pillar shaped movable portion disposed in a center portion and a cylindrical fixed portion disposed around the movable portion. The movable portion comprises a lens holder including a tubular portion for holding a lens assembly and a driving coil fixed to the lens holder so as to position around the tubular portion. The fixed portion includes a yoke comprising a permanent magnet opposite to the driving coil. The lens driving device comprises upper and lower leaf springs disposed both sides of the tubular portion of the lens holder in the direction of an optical axis. The upper and lower plate springs support the lens holder in the direction of the optical axis shiftably so as to position the lens holder in a radial direction. Thereby, the movable portion is positionally adjustable to the direction of the optical axis, by energizing the driving coil, according to interaction between a magnetic field of the permanent magnet and a magnetic field due to a current flowing through the driving coil. According to the first exemplary aspect of this invention, each of the upper and lower leaf springs comprises the above-mentioned leaf spring.

In the lens driving device according to the first exemplary aspect of this invention, each of the upper and lower leaf spring may, for example, comprise an inner edge portion which has an annular shape and which is mounted to the lens holder, an outer edge portion which is apart from the inner edge portion, which has a larger radius than the inner edge portion, and which is mounted to the yoke, N arm portions disposed along a circumferential direction in order to connect the inner edge portion and the outer edge portion, where N represents an integer which is not less than two, N inner coupling portions coupling the inner edge portion and the N arm portions, and N outer coupling portions coupling the outer edge portion and the N arm portions. Each of the upper and lower leaf springs may have N first slits each formed between the outer edge portion and each of the N arm portions, and N second slits each formed between the inner edge portion and each of the N arm portions. In this event, each of the N first slits may comprise a first arc-shaped extending slit portion formed between the outer edge portion and each of the N arm portions, and a first basal slit portion formed in the vicinity of each of the N outer coupling portions, while each of the N second slits may comprise a second substantially arc-shaped extending slit portion formed between the inner edge portion and each of the N arm portions, and a second basal slit portion formed in the vicinity of each of the N inner coupling portions.

A lens driving device according to a second exemplary aspect of this invention is a lens driving device adopting a SMA method where a shape memory alloy (SMA) uses as a driving source. The lens driving device includes a pillar shaped movable portion disposed in a center portion and a cylindrical fixed portion disposed around the movable portion. The movable portion comprises a lens holder including a tubular portion for holding a lens barrel. The fixed portion comprises a housing supporting the movable portion to be movable in the direction of an optical axis alone. The lens driving device comprises a moving unit moving the movable portion in the direction of the optical axis and a guide unit guiding the movable portion to be movable in the direction of the optical axis alone. The moving unit includes a shape memory alloy member hanged under a tension between the lens holder and the housing. The guide unit includes an elastic member disposed between the lens holder and the housing. The elastic member supports the lens holder in the direction of the optical axis alone shiftably so as to position the lens holder in a radial direction. The elastic member comprises upper and lower leaf springs disposed at upper and lower sides of the tubular portion of the lens holder in the direction of the optical axis, respectively. According to the second exemplary aspect of this invention, each of the upper and lower leaf springs comprises the above-mentioned leaf spring.

In the lens driving device according to the second exemplary aspect of this invention, the upper leaf spring may, for example, comprise an upper ring portion mounted to the lens holder at an upper end portion thereof, four upper end portions mounted to the housing, and four upper arm portions connecting the upper ring portion to the four upper end portions, respectively. The lower leaf spring may, for example, comprise a pair of lower leaf spring segments. In this event, each of the pair of lower leaf spring segments may comprise a lower arc-shaped portion mounted to the lens holder at a lower end portion thereof, a pair of lower end portions fixed to the housing, and a pair of lower arm portions connecting the lower arc-shaped portion to the pair of lower end portions.

An exemplary advantage according to the invention is that it is possible to provide a leaf spring and a lens driving device which improves (increases) both of lens inclination (tilt) performance (characteristic) and impact resistant performance (characteristic) because the leaf spring is made of a material having Vickers hardness which is not less than 500 (HV).

While this invention has been particularly shown and described with reference to the exemplary embodiment thereof, the invention is not limited to the embodiment. It will be understood by those of ordinary skill in the art that various changes in form and details may be therein without departing from the spirit and scope of the present invention as defined by the claims. For example, although the high hardness stainless steel is used as the material having Vickers hardness which is not less than 500 (HV) in the above-mentioned exemplary embodiments, it is certainly not limited to this. Although three or four arm portions 233 connect between the inner edge portion 211 and the outer edge portion 222 in the leaf springs of the above-mentioned examples, this invention generally may be applicable to a leaf spring in which N arm portions connect between the inner edge portion 211 and the outer edge portion 222, where N represents an integer which is not less than two. However, it is preferable that the integer N lies in a range between two and four, both inclusive.

What is claimed is:

1. A leaf spring supporting a pillar shaped movable portion disposed in a center portion with respect to a cylindrical fixed portion disposed around said movable portion in a direction of a center axis shiftably so as to position said movable portion in a radial direction, said leaf spring comprising:
   an inner edge portion having an annular shape;
   an outer edge portion apart from said inner edge portion, said outer edge portion having a larger radius than said inner edge portion;
   N arm portions disposed along a circumferential direction in order to connect said inner edge portion and said outer edge portion, where N represents an integer which is not less than two;
   N inner coupling portions coupling said inner edge portion and said N arm portions; and
   N outer coupling portions coupling said outer edge portion and said N arm portions;
   wherein said leaf spring is made of a material having a Vickers hardness which is not less than 500 (HV).

2. The leaf spring as claimed in claim 1, wherein the material of said leaf spring is stainless steel.

3. The leaf spring as claimed in claim 1, wherein said leaf spring further comprises:
   N first slits each formed between said outer edge portion and each of said N arm portions; and
   N second slits each formed between said inner edge portion and each of said N arm portions,
   wherein each of said N first slits comprises:
      a first substantially arc-shaped extending slit portion formed between said outer edge portion and each of said N arm portions; and
      a first basal slit portion formed in a vicinity of each of said N outer coupling portions, and
   wherein each of said N second slits comprises:
      a second substantially arc-shaped extending slit portion formed between said inner edge portion and each of said N arm portions; and
      a second basal slit portion formed in a vicinity of each of said N inner coupling portions.

4. The leaf spring as claimed in claim 3, wherein said first basal slit portion has a swelled shape which has a width larger than a slit width of said first arc-shaped extending slit portion and which is enclosed by a curve formed so as to be apart from a basal portion of each of said N arm portions.

5. The leaf spring as claimed in claim 3, wherein each of said N inner coupling portions has an opening for mounting said inner edge portion to said movable portion, wherein said second basal slit portion is formed close to said opening to be protruded from said second substantially arc-shaped extending slit portion so as to be apart from a basal portion of each of said N arm portions.

6. The leaf spring as claimed in claim 3, wherein said second basal slit portion is formed to be protruded from said second substantially arc-shaped extending slit portion so as to be apart from each of said N arm portions.

7. The leaf spring as claimed in claim 6, wherein said outer edge portion has a circular hole formed at a corner thereof to mount said outer edge portion to said fixed portion and an arc-shaped slit formed between said circular hole and said first basal slit portion.

8. The leaf spring as claimed in claim 3, wherein said first basal slit portion has a swelled shape which has a width larger than a slit width of said first arc-shaped extending slit portion and which is enclosed by a curve, wherein said second basal slit portion has a swelled shape which is width larger than a slit width of said second substantially arc-shaped extending slit portion and which is enclosed by a curve.

9. The leaf spring as claimed in claim 1, wherein an arm aspect ratio (w/t) lies in a range between 6.0 and 1.5, both inclusive, where t represents a plate thickness of said plate spring and w represents a width of each of said N arm portions.

10. The leaf spring as claimed in claim 9, wherein said integer N lies in a range between two and four, both inclusive.

11. The leaf spring as claimed in claim 9, wherein each of said N arm portions has at least one slit.

12. The leaf spring as claimed in claim 9, wherein adjacent arm portions are disposed to be overlapped with each other.

13. The leaf spring as claimed in claim 9, wherein said inner edge portion includes a bellows portion.

14. A lens driving device adopting a VCM method where a voice coil motor (VCM) is used as a driving source, said lens driving device including a pillar shaped movable portion disposed in a center portion and a cylindrical fixed portion disposed around said movable portion,
   said movable portion comprising a lens holder including a tubular portion for holding a lens assembly and a driving coil fixed to said lens holder so as to position around the tubular portion,
   said fixed portion including a yoke comprising a permanent magnet opposite to said driving coil,
   said lens driving device comprising upper and lower leaf springs disposed on both sides of the tubular portion of said lens holder in a direction of an optical axis, said upper and lower leaf springs supporting said lens holder in the direction of the optical axis shiftably so as to position said lens holder in a radial direction, whereby said movable portion is positionally adjustable to the direction of the optical axis, by energizing said driving coil, according to interaction between a magnetic field of said permanent magnet and a magnetic field due to a current flowing through said driving coil,
   wherein each of said upper and lower leaf springs is made of a material having a Vickers hardness which is not less than 500 (HV).

15. The lens driving device as claimed in claim 14, wherein each of said upper and lower leaf springs comprises:
   an inner edge portion having an annular shape, said inner edge portion being mounted to said lens holder;
   an outer edge portion apart from said inner edge portion, said outer edge portion having a larger radius than said inner edge portion, said outer edge portion being mounted to said yoke;
   N arm portions disposed along a circumferential direction in order to connect said inner edge portion and said outer edge portion, where N represents an integer which is not less than two;

N inner coupling portions coupling said inner edge portion and said N arm portions; and N outer coupling portions coupling said outer edge portion and said N arm portions.

16. The lens driving device as claimed in claim 15, wherein each of said upper and lower leaf springs comprises:

N first slits each formed between said outer edge portion and each of said N arm portions; and N second slits each formed between said inner edge portion and each of said N arm portions, wherein each of said N first slits comprises:

a first substantially arc-shaped extending slit portion formed between said outer edge portion and each of said N arm portions; and a first basal slit portion formed in a vicinity of each of said N outer coupling portions, and wherein each of said N second slits comprises:

a second substantially arc-shaped extending slit portion formed between said inner edge portion and each of said N arm portions; and a second basal slit portion formed in a vicinity of each of said N inner coupling portions.

17. A lens driving device adopting a SMA method where a shape memory alloy (SMA) is used as a driving source, said lens driving device including a pillar shaped movable portion disposed in a center portion and a cylindrical fixed portion disposed around said movable portion, said movable portion comprising a lens holder including a tubular portion for holding a lens barrel, said fixed portion comprising a housing supporting said movable portion to be movable in a direction of an optical axis alone, said lens driving device comprising a moving unit moving said movable portion in the direction of said optical axis and a guide unit guiding said movable portion to be movable in the direction of said optical axis alone, said moving unit including a shape memory alloy member hanged under a tension between said lens holder and said housing, said guide unit including an elastic member disposed between said lens holder and said housing, said elastic member supporting said lens holder in the direction of said optical axis alone shiftably so as to position said lens holder in a radial direction, said elastic member comprising upper and lower leaf springs disposed at upper and lower sides of the tubular portion of said lens holder in the direction of said optical axis, respectively, wherein each of said upper and lower leaf springs is made of a material having a Vickers hardness which is not less than 500 (HV).

18. The lens driving device as claimed in claim 17, wherein said upper leaf spring comprises:

an upper ring portion mounted to said lens holder at an upper end portion thereof;

four upper end portions mounted to said housing; and four upper arm portions connecting said upper ring portion to said four upper end portions, respectively.

19. The lens driving device as claimed in claim 17, wherein said lower leaf spring comprises a pair of lower leaf spring segments, and wherein each of the pair of lower leaf spring segments comprises:

a lower arc-shaped portion mounted to said lens holder at a lower end portion thereof;

a pair of lower end portions fixed to said housing; and a pair of lower arm portions connecting said lower arc-shaped portion to said pair of lower end portions.

\* \* \* \* \*